United States Patent
Kernbaum et al.

(10) Patent No.: US 11,674,564 B2
(45) Date of Patent: Jun. 13, 2023

(54) PURE ROLLING CYCLOID TRANSMISSIONS WITH VARIABLE EFFECTIVE DIAMETER ROLLERS AND ROLLER CONSTRAINTS

(71) Applicant: SRI International, Menlo Park, CA (US)

(72) Inventors: Alexander Kernbaum, Menlo Park, CA (US); Murphy Kitchell, Menlo Park, CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 17/633,790

(22) PCT Filed: Aug. 26, 2020

(86) PCT No.: PCT/US2020/048029
§ 371 (c)(1),
(2) Date: Feb. 8, 2022

(87) PCT Pub. No.: WO2021/041564
PCT Pub. Date: Mar. 4, 2021

(65) Prior Publication Data
US 2022/0290739 A1  Sep. 15, 2022

Related U.S. Application Data

(60) Provisional application No. 62/891,551, filed on Aug. 26, 2019.

(51) Int. Cl.
*F16H 1/32* (2006.01)
*F16H 13/08* (2006.01)

(52) U.S. Cl.
CPC ............... *F16H 1/32* (2013.01); *F16H 13/08* (2013.01); *F16H 2001/323* (2013.01)

(58) Field of Classification Search
CPC ...... F16H 1/32; F16H 13/08; F16H 2001/325; F16H 2001/323
See application file for complete search history.

(56) References Cited

U.S. PATENT DOCUMENTS

| 5,123,882 A | 6/1992 | Baranyi |
| 5,145,468 A * | 9/1992 | Nagabhusan ............. F16H 1/32 475/179 |

(Continued)

FOREIGN PATENT DOCUMENTS

| WO | WO-2017109876 A1 * | 6/2017 | ............... F16H 1/32 |
| WO | WO-2017179623 A1 * | 10/2017 | ............... F16H 1/32 |

OTHER PUBLICATIONS

International Search Report and Written Opinion dated Oct. 22, 2020 for PCT/US2020/048029, 8 pages.

*Primary Examiner* — Sherry L Estremsky
(74) *Attorney, Agent, or Firm* — McDonnell Boehnen Hulbert & Berghoff LLP

(57) ABSTRACT

A variety of transmissions, and improvements thereof, are provided having improved efficiency and other benefits. The transmissions include one or more inner members that are driven by one or more cams or other means to engage in precessional rotation about an axis of rotation that, itself, orbits about a primary axis of rotation. A plurality of shaped rollers are in contact with shaped cutouts on the inner member(s) and on a ground member such that an input rotation/torque applied via the cam is realized as an output rotation/torque at an output member that is coupled to the inner member(s). Tire rollers and contact surfaces are shaped such that the rollers engage in rolling motion relative to the contact surfaces, providing improved efficiency. Multiple inner members, and corresponding sets of shaped rollers, (Continued)

can be provided to increase power capacity, reduce torque ripple, reduce wobble, or provide other benefits.

44 Claims, 13 Drawing Sheets

(56) References Cited

U.S. PATENT DOCUMENTS

| | | | |
|---|---|---|---|
| 10,612,635 B2 * | 4/2020 | Edelson | B60K 7/0007 |
| 2011/0082000 A1 | 4/2011 | Makino | |
| 2017/0299024 A1 | 10/2017 | Yoshioka et al. | |
| 2019/0242464 A1 | 8/2019 | Kernbaum et al. | |

* cited by examiner

PURE ROLLING CYCLOID TRANSMISSIONS WITH VARIABLE EFFECTIVE DIAMETER ROLLERS AND ROLLER CONSTRAINTS

CROSS-REFERENCE TO RELATED APPLICATION

This application claims priority to U.S. Patent Application No. 62/891,551, filed Aug. 26, 2019, which is incorporated herein by reference. This application also incorporates by reference the contents of U.S. patent application Ser. No. 15/738,706, filed Dec. 21, 2017.

BACKGROUND

Unless otherwise indicated herein, the materials described in this section are not prior art to the claims in this application and are not admitted to be prior art by inclusion in this section.

The term "transmission" may refer generally to systems that provide speed and torque conversions from a rotating power source to another device. Industrial machinery, medical robotics, and domestic electronics may utilize such transmissions. Selecting or designing a transmission involves considering multiple factors. Example factors include load capacity, efficiency, and cost.

Transmissions are included as part of a variety of mechanisms in order to provide a mechanical advantage between an input torque and an output torque. Thus, a transmission may be included to match properties of a motor, engine, turbine, or other torque generator (e.g., a torque-speed curve, an efficiency curve) to properties of an effector, a wheel, a generator, or some other intended application for a generated torque. For example, a transmission may be provided in an automobile to match the high rotational speed and relatively lower torque generated by an internal combustion engine to lower speed and higher torque requirements for driving the wheels of automobile. In another example, a transmission may be provided to couple an internal combustion engine to a generator such that both the internal combustion engine and the generator are operated according to respective efficient rotational speeds.

Couplings are included as part of a variety of mechanisms to couple shafts or other rotating mechanical elements such that torques and rotations may be transmitted between the mechanical elements. A coupling may be configured to permit transmission of rotations/torques between shafts that have offset axes of rotation, that have non-parallel axes of rotation, or that differ in some other way with respect to their axes of rotation. For example, an Oldham coupling couples two shafts having parallel but offset axes of rotation. In some examples, a coupling may be configured to permit the shafts (or other coupled rotating mechanical elements) to vary over time with respect to the location and/or angle of their axes of rotation. For example, a universal joint couples two shaft having rotational axes at different angles and permit, those angles to very over time.

Couplings may be provided as part of another mechanism. For example, a transmission may include one or more couplings to couple rotation of elements within the transmission. In particular, a variety of transmissions (e.g., a cycloidal drive) include one or more elements that engage in cycloidal motion and that are coupled to an output shaft (or other output element) of the transmission. Such cycloidal motion can be described as rotation about an axis of rotation that is, itself, orbiting about another axis of rotation. In a cycloidal drive or in other mechanisms, the axis of rotation of a first element (e.g., a cycloid gear) may be orbiting about the axis of rotation of an output element (e.g., as the first element is driven by a cam coupled to an input of the mechanism). The offset between the axis of rotation of the first element and the axis of rotation of the output element may remain substantially constant.

SUMMARY

Some embodiments of the present disclosure provide a transmission including: (i) a sun gear, (ii) an input member coupled to the sun gear such that rotation of the input member results in rotation of the sun gear; (iii) two or more planet gears that are in geared contact with the sun gear; (iv) two or more cams, each one of the two or more cams being coupled to a respective one of the two or more planet gears such that rotation of the sun gear results in rotation of each of the two or more cams; (v) an eccentric member that is coupled to the two or more cams such that rotation of the two or more cams results in eccentric motion of the eccentric member, wherein the eccentric member has two contact surfaces that define a series of variable-width cutouts; (vi) a ground member that has at least two contact surfaces that define a series of variable-width cutouts; (vii) an output member coupled to the eccentric member such that rotation of the eccentric member results in rotation of the output member; (viii) a plurality of rollers, each roller of the plurality of rollers being in contact with the contact surfaces of the eccentric member and the ground member such that rotation of the input member results in rotation of the eccentric member, whereby the rotation of the input member causes rotation of the output member.

Some embodiments of the present disclosure provide a transmission including: (i) an input member; (ii) a first eccentric member that is coupled to the input member such that rotation of the input member results in eccentric motion of the first eccentric member, wherein the first eccentric member has first and second contact surfaces that define a series of variable-width cutouts; (iii) a second eccentric member that is coupled to the input member such that rotation of the input member results in eccentric motion of the second eccentric member, wherein the second eccentric member has third and fourth contact surfaces that define a series of variable-width cutouts; (iv) a ground member that has (1) fifth and sixth contact surfaces that define a series of variable-width cutouts and (2) seventh and eighth contact surfaces that define a series of variable-width cutouts; (v) an output member coupled to the first and second eccentric members such that rotation of the first and second eccentric members results in rotation of the output member; (vi) a first plurality of rollers and a second plurality of rollers, each roller of the first plurality of rollers being in contact with the first, second, fifth, and sixth contact surfaces and each roller of the second plurality of rollers being in contact with the third, fourth, seventh, and eighth contact surfaces such that rotation of the input member results in rotation of the first and second eccentric members, whereby the rotation of the input member causes rotation of the output member, wherein each roller of the first plurality of rollers is coupled to a corresponding roller of the second plurality of rollers via a respective mid-plane constraining element that constrains, with respect to at least one degree of freedom, the location and rotation of the roller of the first plurality of rollers relative to the corresponding roller of the second plurality of rollers.

Some embodiments of the present disclosure provide a transmission including: (i) an input member; (ii) a first eccentric member that is coupled to the input member such that rotation of the input member results in eccentric motion of the first eccentric member; (iii) a second eccentric member that is coupled to the input member such that rotation of the input member results in eccentric motion of the second eccentric member in phase with the eccentric motion of the first eccentric member, wherein the first and second eccentric members have respective first and second contact surfaces that define a series of variable-width cutouts; (iv) a third eccentric member that is coupled to the input member such that rotation of the input member results in eccentric motion of the third eccentric member, wherein the third eccentric member has third and fourth contact surfaces that define a series of variable-width cutouts, and wherein the third eccentric member is located between the first eccentric member and the second eccentric member; (v) a ground member that has (1) fifth and sixth contact surfaces that define a series of variable-width cutouts and (2) seventh and eighth contact surfaces that define a series of variable-width cutouts; (vi) an output member coupled to the first, second, and third eccentric members such that rotation of the first, second, and third eccentric members results in rotation of the output member; (vii) a first plurality of rollers and a second plurality of rollers, each roller of the first plurality of rollers being in contact with the first, second, fifth, and sixth contact surfaces and each roller of the second plurality of rollers being in contact with the third, fourth, seventh, and eighth contact surfaces such that rotation of the input member results in rotation of the first and second eccentric members, whereby the rotation of the input member causes rotation of the output member, wherein each roller of first plurality of rollers is coupled to a corresponding roller of the second plurality of rollers via a respective mid-plane constraining element that constrains, with respect to at least one degree of freedom, the location and rotation of the roller of the first plurality of rollers relative to the corresponding roller of the second plurality of rollers.

These as well as other aspects, advantages, and alternatives, will become apparent to those of ordinary skill in the art by reading the following detailed description, with reference where appropriate to the accompanying drawings.

DETAILED DESCRIPTION

Figure 1B:
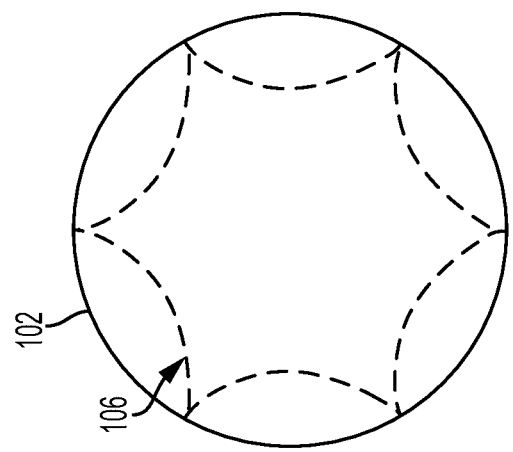
FIG. 1B illustrates a cycloid curve resulting from rolling a circle within a ring, in accordance with an example implementation.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Transmissions are provided herein that include an inner member that, in response to being driven by an input via one or more cams, engages in precessional rotation about an axis of rotation that, itself, orbits about a primary axis of rotation of the transmission. This precessional motion is coupled to an output of the transmission to provide a conversion between the torque/rotation of the input and output according to a transmission ratio of the transmission. Reaction forces are transmitted between the inner member and a ground of the transmission via a plurality of shaped rollers. The shaped rollers are in contact with the inner member and the ground via shaped contact surfaces that define variable-width cutouts such that, as the inner member rotates, the shaped rollers engage in rolling motion relative to the contact surfaces. This rolling motion results in the transmission having a high efficiency, a high power/torque rating, an increased lifetime, and other benefits.

In some embodiments, multiple such transmissions are provided in parallel. This can be done to increase the load capacity of the combined transmission, to increase the lifetime of the combined transmission, or to provide other benefits. For example, the different sub-transmissions of such a combined transmission may be driven at different phases relative to each other (e.g., by being driven by respective different cams that are coupled to a single input with respective different angular offsets relative to each other). Such an arrangement may provide a reduction in torque ripple. Additionally or alternatively, the relative phasing of the individual transmissions may be specified to reduce the translational and/or rotational vibration or wobble of the transmission during operation due to the motion of off-center masses (e.g., the motion of the inner members of the various transmissions). This can include splitting one of the sub-transmissions such that its elements are disposed on either side of a central sub-transmission such that the rotating masses of the central and split transmissions are completely balanced during operation of the combined transmission.

Where two (or more) transmissions of such a combined transmission have relative phases of approximately 180 degrees, the rollers of the two transmission may be coupled together in order to maintain the rotational phasing of the rollers. This may be done to prevent the rotational phasing, orientation, location, or other properties of the rollers from being misaligned or otherwise sub-optimal, which may lead to binding, increased wear, reduced lifetime, reduced transmission efficiency, or other unwanted effects. Individual rollers of one transmission may be coupled to corresponding rollers of a second transmission via a mid-plane constraint element that constrains the relative orientation and location of the rollers in all six degrees of freedom (e.g., by fusing or otherwise rigidly coupling the corresponding rollers together) or in some lesser number of degrees of freedom. For example, a shaped rod, set of shaped elements, or other mid-plane constraint element(s) could act to constrain the relative rotation of corresponding rollers while permitting the corresponding rollers to vary with respect to the other two rotational degrees of freedom and with respect to the three translational degrees of freedom. Such coupling between pairs of rollers may allow the rotational phasing of a first roller to be maintained, by torques and/or forces transmitted from a second roller to which the first roller is coupled, even during portions of the first roller's motion that are otherwise under-constrained (e.g., due to the first roller being momentarily out of contact with one or more contact surfaces with which it is usually in contact). Such a coupling, even when it constrains the relative location and orientation of a pair of rollers in all six degrees of freedom, does not necessarily over-constrain the locations and orientations of the rollers of the pair.

Such a mid-plane constraint element can be configured to provide additional benefits. For example, a cage or other aligning element(s) could be provided to maintain the relative locations of the mid-plane constraint elements, thereby maintaining the relative locations of the rollers coupled thereto. In another example, the mid-plane constraint elements could be in geared contact, rolling contact, or some other form of contact with an inner member and/or ground of the transmission, thereby maintaining the proper rotational phasing of the rollers coupled thereto.

An inner member of a transmission as described herein may be driven by a single cam or otherwise coupled to an input of the transmission. In some examples, such an inner member may be driven additionally or alternatively by two or more cams acting as planets in a planetary gear arrangement, with a sun gear of the planetary gear arrangement being coupled to the transmission input. This may provide benefits with regard to the transmission ratio of the transmission. In some examples, an output of the transmission may be coupled to the axles of the two or more cams to facilitate coupling of the inner member to the output.

II. Example Transmissions

As used herein, the term "cycloid" refers to the curve traced by a point on a rim of a circular wheel as the wheel rolls along either a straight or circular path without slippage. Such cycloid motion is a variety of "eccentric motion" or "roulette motion" wherein an object rotates about an axis of rotation that, itself, orbits about another axis of rotation (e.g., an axis of rotation of a cam that is coupled to a member that undergoes such eccentric motion). In an example, such eccentric, roulette, and/or cycloidal motion results when the circular wheel rolls inside a main circle or ring. FIG. 1A illustrates a circle 100 rolling within a ring 102, in accordance with an example implementation. A point 104 on a rim of the circle 100 traces a cycloid curve as the circle 100 moves along an internal surface of the ring 102.

Figure 1A:
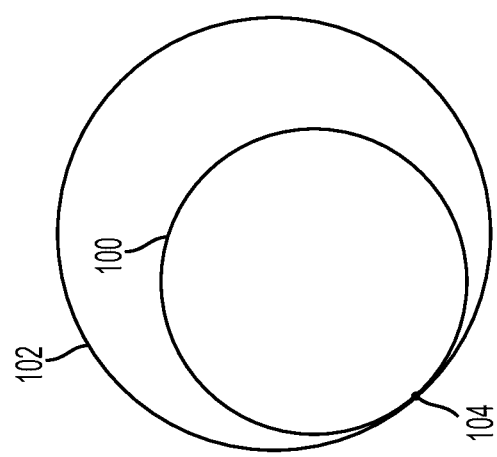
FIG. 1A illustrates a circle rolling within a ring, in accordance with an example implementation.

FIG. 1B illustrates a cycloid curve 106 resulting from rolling the circle 100 within the ring 102, in accordance with an example implementation. The cycloid curve 106 is traced by the point 104 as the circle 100 rolls within the ring 102. The motion of the circle 100, while the ring 102 remains stationary, could be referred to as eccentric motion.

Disclosed herein are example transmission systems and apparatuses that utilize this eccentric motion. The eccentric motion for a particular embodiment as described herein may include rollers, bearings, cams, or other elements engaging in cycloidal motion, epicycloidal motion, trochoidal motion, or motion according to some other roulette path and/or trajectory. These systems and apparatuses can provide an advantageous configuration that may achieve high efficiency, increased service lifetime, light weight, increased power/torque rating, small form factor, or other benefits. These transmission systems could be used in robotic applications where motors and transmissions could be mounted at a distance from the main body of a robot. Automotive, heavy industry, and energy generation, among other applications, could also benefit from utilizing the transmissions described herein.

Figure 2A:
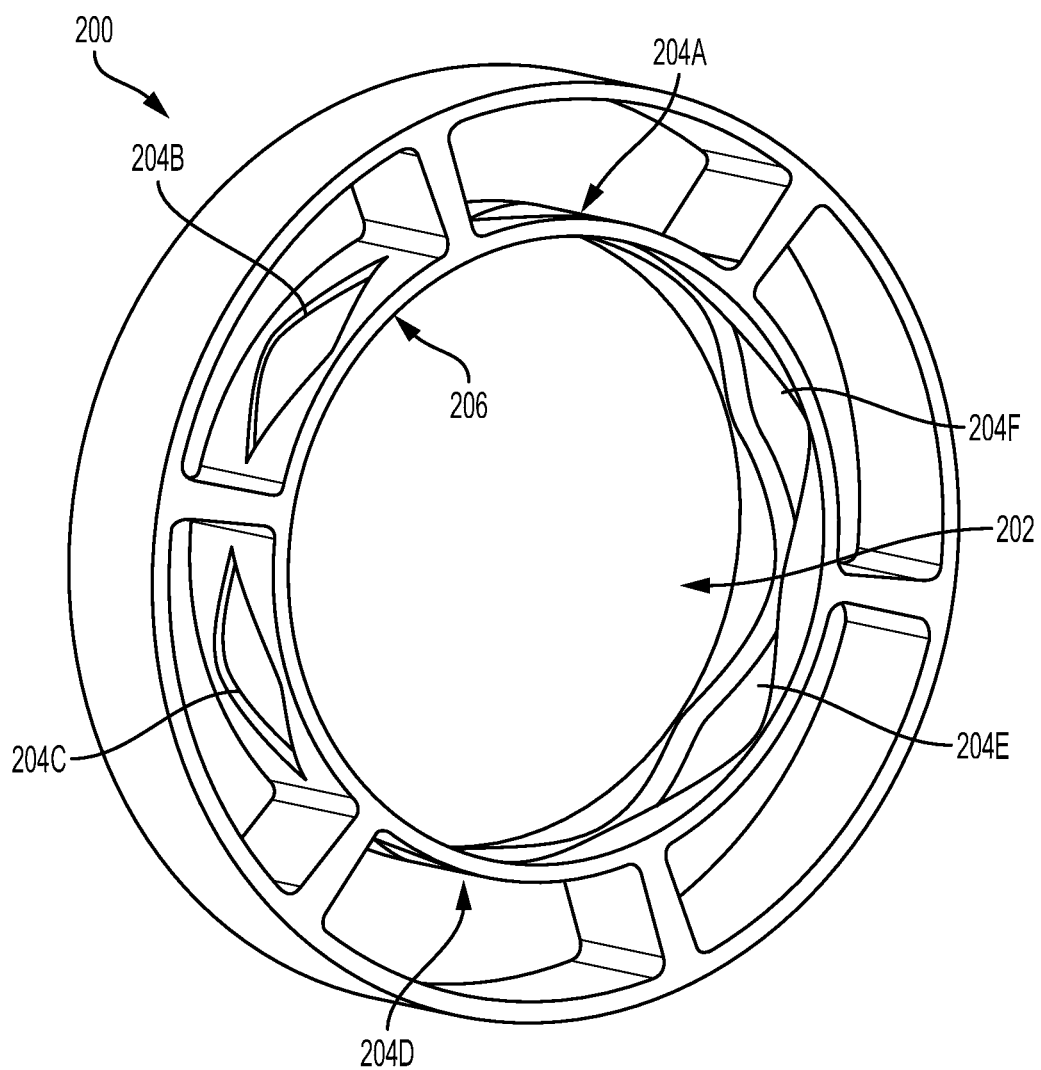
FIG. 2A illustrates a first ring, in accordance with an example implementation.

FIGS. 2A, 2B, 2C, and 2D illustrate elements of an example transmission, in accordance with an example implementation. Particularly, FIG. 2A illustrates a first ring 200, in accordance with an example implementation. The first ring 200 has an open annular space 202 and a series of variable-width cutouts 204A, 204B, 204C, 204D, 204E, and 204F defined by contact surfaces disposed on an interior peripheral surface 206 of the first ring 200.

Figure 2B:
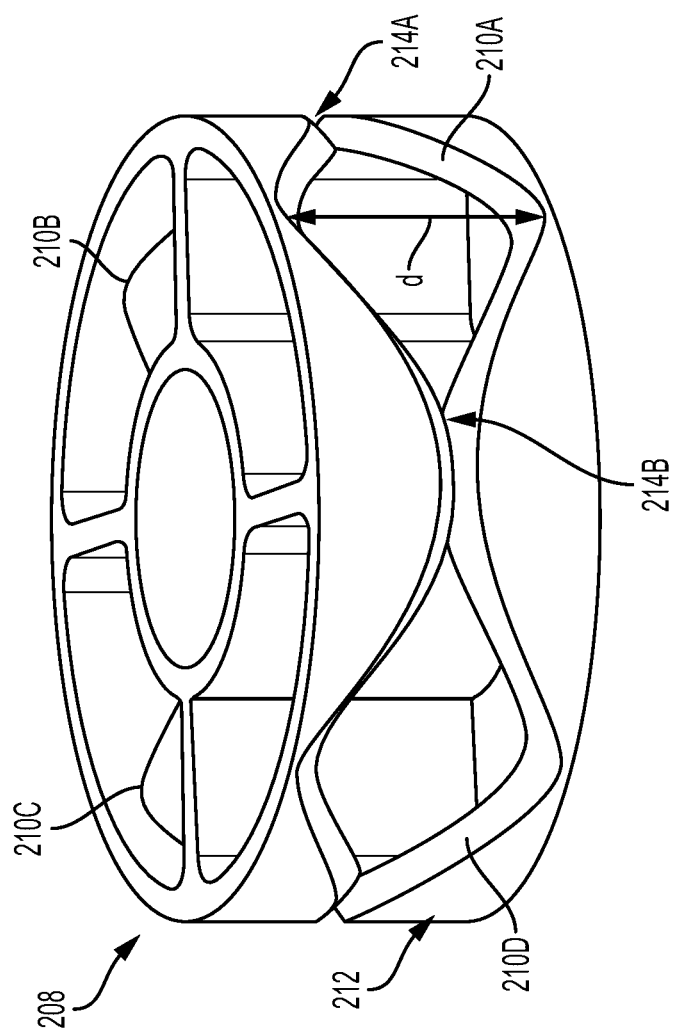
FIG. 2B illustrates a second ring rotatable within an open annular space of the first ring shown in FIG. 2A, in accordance with an example implementation.

FIG. 2B illustrates a second ring 208 that is rotatable within the open annular space 202 of the first ring 200, in accordance with an example implementation. The second ring 208 has a respective series of variable-width cutouts such as cutout 210A, 210B, 210C, and 210D defined by contact surfaces disposed on an exterior peripheral surface 212 of the second ring 208.

Each cutout of the series of variable-width cutouts 204A-F of the first ring 200 and the series of variable-width cutouts 210A-D of the second ring 208 starts with a first width at a first end of the cutout. The width then increases to a second width larger than the first width at a center of the cutout, and then narrows back to the first width at a second end of the cutout. To illustrate, the cutout 210A of the second ring 208 has a first end 214A and a second end 214B. The width of the cutout 210A at the first end 214A is small. The width then increases gradually to a width "d" at a center of the cutout 210A, then decreases gradually until the second end 214B, where the width is similar to the width at the first end 214A.

FIGS. 2A and 2B illustrate separate cutouts 204A-F and 210A-D that are separated by blank areas of the interior peripheral surface 206 and the exterior peripheral surface 212, respectively. For instance, referring to the first ring 200 illustrated in FIG. 2A, the cutouts 204A-F form respective portions of a continuous contact surface.

However, in other example implementations the surfaces 206 and 212 may each have a respective continuous variable-width channel or groove disposed therein. Each continuous variable-width channel or groove may be analogous to a raceway of a bearing. In this analogy, the rings 200 and 208 operate similar to races of the bearing. A width of the variable-width groove may vary gradually between a first width and a second width larger than the first width. For instance, the first width may be similar to the width at the first end 214A of the cutout 210A, and the second width may be similar to the width "d" at the center of the cutout 210A. The variable-width cutouts 204A-F and 210A-D may represent regions of the variable-width move that increase from the first width to the second width and back to the first width. The variable-width cutouts 204A-F and 210A-D may then be separated by portions such as a portion of the variable-width groove having the first width or some other width. In this manner, the variable-width cutouts 204A-F and 210A-D may be portions of respective variable-width continuous grooves or raceways.

Figure 2C:
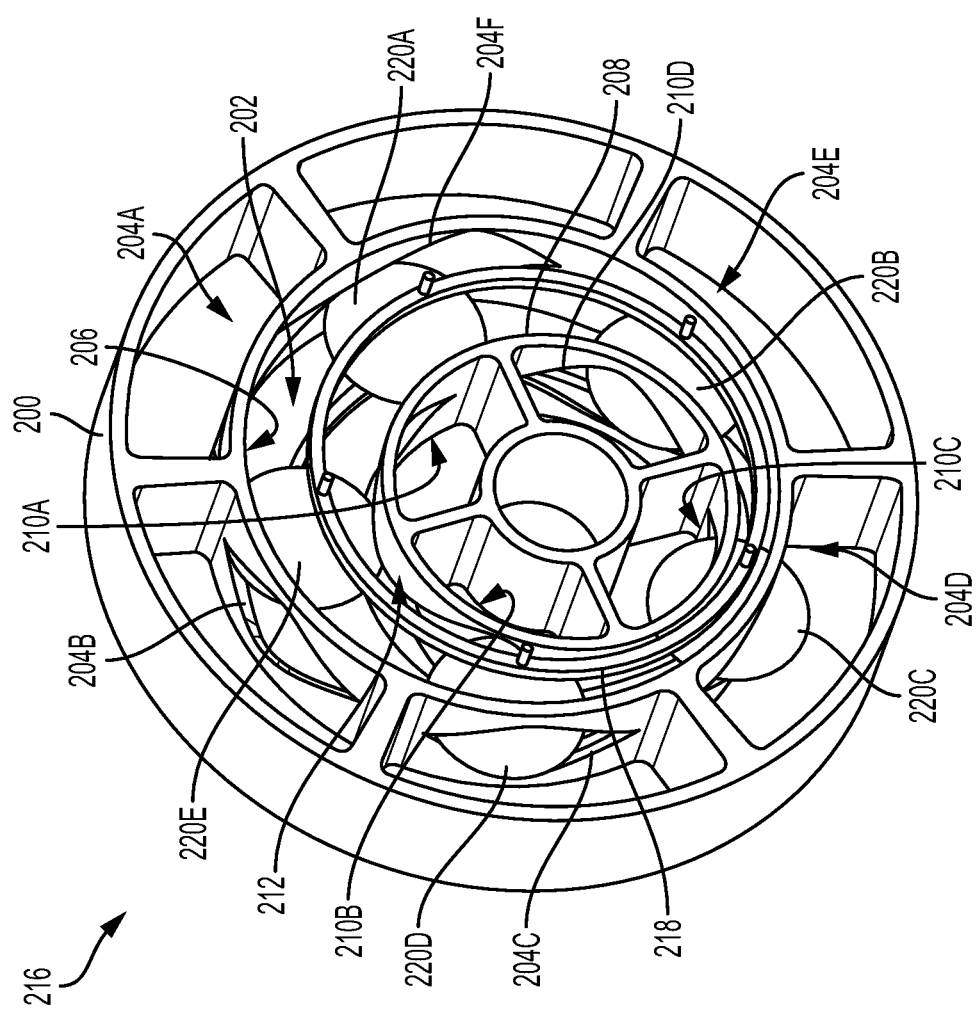
FIG. 2C illustrates a cycloid drive apparatus with the second ring of FIG. 2B rotatable within the first ring of FIG. 2A, in accordance with an example implementation.

FIG. 2C illustrates an eccentric drive transmission 216 with the second ring 208 rotatable within the first ring 200 (e.g., as a result of being driven by a cam that is disposed within the middle of the second ring 208 and that is coupled to an input member), in accordance with an example implementation. The apparatus 216 includes a roller cage 218 that is disposed between the first ring 200 and the second ring 208 and configured to couple a plurality of shaped rollers 220A, 220B, 220C, 220D, and 220E to each other. The roller cage 218 is rotatable in the open annular space 202 of the first ring 200 as the plurality of rollers 220A-E roll on and between the interior peripheral surface 206 of the first ring 200 and the exterior peripheral surface 212 of the second ring 208. The roller cage 218 couples the rollers 220A-E such that the rollers 220A-E are equidistant from each other.

As each roller of the rollers 220A-E roll on the interior peripheral surface 206 and the exterior peripheral surface 212 of the second ring 208, the roller traverses the cutouts 204A-F and 210A-D. As a roller of the rollers 220A-E traverse a cutout of the cutouts 204A-F and 210A-D, the roller moves from an area of the cutout that has a small width to an area that is wider (i.e., near a center region of the cutout). Thus, as the roller passes over the cutout, more or less of the roller engages in the cutout. Particularly, at the wider area of the cutout, the roller passes deeper through the surface that the cutout is disposed in, i.e., the interior peripheral surface 206 or the exterior peripheral surface 212. Thus, as the roller traverses through the cutout, a radial distance between a center of the first ring 200 and the roller varies.

To illustrate, as shown in FIG. 2C, the roller 220E is less engaged with the cutout 204B as the roller 220E is near one end of the cutout 204B. On the other hand, the roller 220D is more engaged with the cutout 204C, i.e., the roller 220D is disposed deeper in the cutout 204C as the roller 220D nears the center of the cutout 204C. The roller 220C is even more engaged with the cutout 204D than the roller 220D is engaged with the cutout 204C as the roller 220C is substantially at the center of the cutout 204D. The rollers 220A-E behave similarly and engage more or less with the cutouts 210A-D of the second ring 208 as the rollers 220A-E traverse the cutouts 210A-D. The variable width of the cutouts or grooves defining the cutout is the means by which the effective diameter of the rollers is varied as the rollers traverse the cutouts or grooves. The variation of the effective diameter of the rollers enables maintaining pure, or nearly pure, rolling motion of the rollers relative to the contact surfaces of the rings 200, 208 of the apparatus 216.

As mentioned above, the cutouts 204A-F and 210A-D could be parts of a respective variable-width groove that operates analogously to the raceways of a bearing. Thus, in principle, each of the rollers 220A-E contacts each raceway at a single point. However, a load on an infinitely small point would cause infinitely high contact pressure. In practice, the roller deforms (flattens) slightly where it contacts each raceway, much as a tire flattens where it touches the road. The raceway also dents slightly where each roller presses on it. Thus, the contact between roller and raceway is of finite size and has finite pressure.

In an example, the apparatus 216 could operate as a cycloid speed reducer or transmission configured to reduce the speed of an input shaft by a certain ratio. For instance, the second ring 208 could be eccentrically mounted via a cam and hearing to an input shaft (not shown). In this configuration, the input shaft drives the second ring 208 eccentrically along a curved path within the open annular space 202 of the first ring 200. Further, in an example, the first ring 200 could be configured as a stator or ground of the speed reducer (i.e., the first ring 200 could be fixed). Then, an output shaft could be coupled to the second ring 208, with the output shaft having a reduced speed compared to the input shaft. In another example, the first ring 200 could be coupled to an output shaft and rotatable, whereas the second ring 208 could be fixed and configured to operate as the stator of the speed reducer. Thus, the input, output, and stator/ground designations are interchangeable in reference to the embodiments of FIGS. 2A-F or elsewhere herein.

For the apparatus 216 to operate as such a speed modifying (e.g., reducing or increasing) transmission, the total number of variable-width cutouts 210A-D of the second ring 208 is less than the total number of variable-width cutouts 204A-F of the first ring 200. Further, a total number of valid locations for the rollers 220A-E (which may be greater than or equal to the total number of rollers) is less than the total number of variable-width cutouts 204A-F of the first ring 200 and greater than the total number of variable-width cutouts 210A-D of the second ring 208. In the apparatus 216 described above, the first ring 200 has six cutouts, the second ring 208 has four cutouts, and five rollers 220A-E are disposed between the first ring 200 and the second ring 208.

The reduction ratio of the transmission is determined based on the total number of valid locations for the rollers 220A-E. Particularly, the reduction ratio could be calculated using the following equation:

$$R = \frac{N_r - 1}{2} \qquad (1)$$

where R is the reduction ratio and N is the number of rollers.

One advantage of the apparatus 216 is that, based on equation (1), the apparatus 216 is capable of providing non-integer reduction ratios. As an example, if the first ring 200 has seven cutouts, the second ring 208 has five cutouts, and six rollers are disposed between the first ring 200 and the second ring 208 the ratio R can be calculated by equation (1) to be 2.5:1.

In examples, the total number of cutouts and rollers are three consecutive integers, e.g. 4 cutouts for the second ring 208, 5 rollers in the roller cage 218, and 6 cutouts in the first ring 200, as illustrated in FIGS. 2A-2C. However, cycloid drives with other patterns e.g. 4 cutouts for the second ring 208, 6 rollers in the roller cage 218, and 8 cutouts in the first ring 200, are also possible.

Figure 2D:
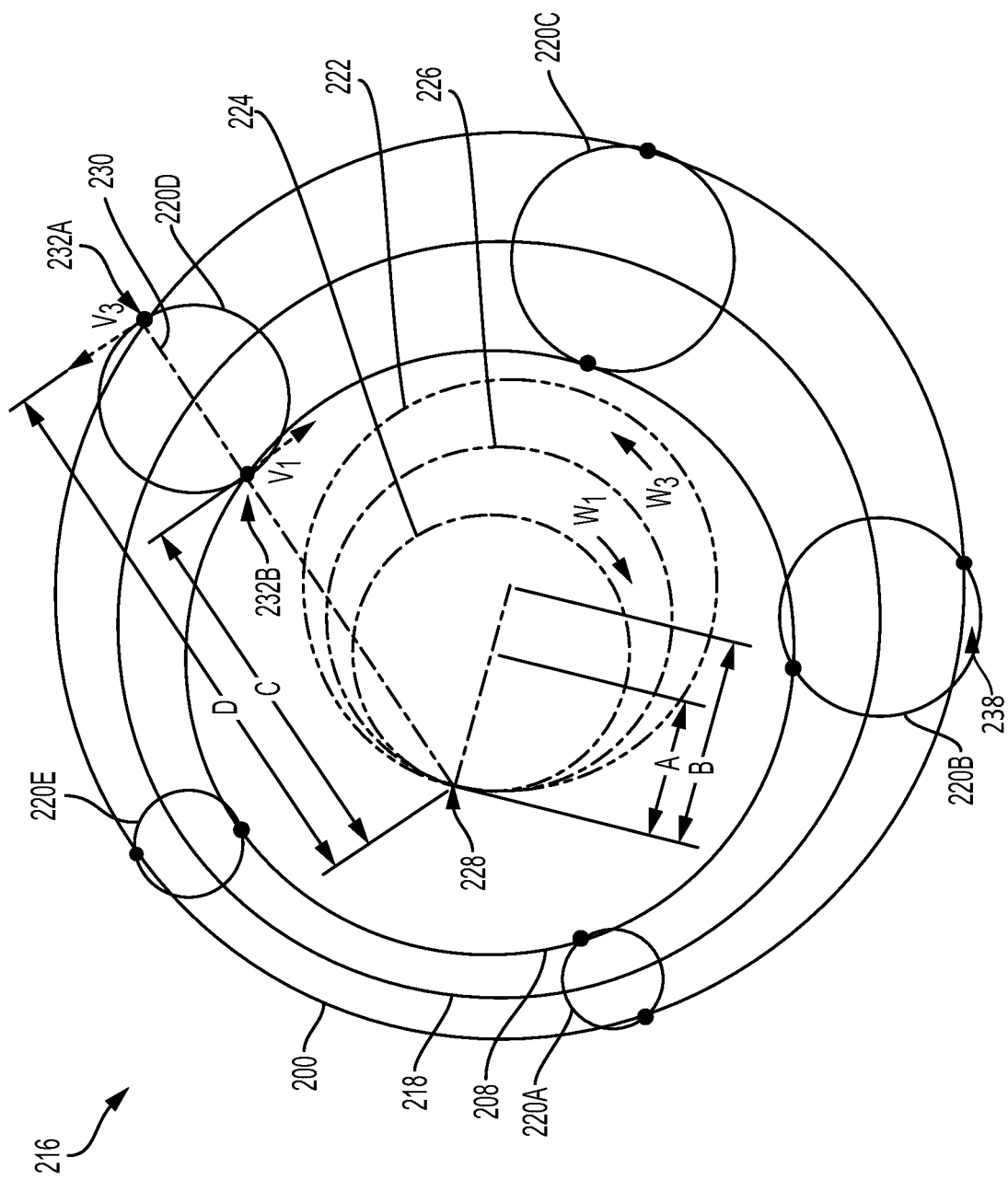
FIG. 2D illustrates a simplified diagram of the apparatus shown in FIG. 2C, in accordance with an example implementation.

Pure rolling occurs when both the magnitude and direction of the linear velocities of rigid bodies at their contact points match. Such pure, or nearly pure, rolling motion can result in reduced wear and reduced generation of waste heat (e.g., by reducing relative motion between surfaces that are in contact), resulting in increased efficiency, increased device lifetime, and other benefits. FIG. 2D illustrates a simplified diagram of the apparatus 216, in accordance with an example implementation. The following analysis holds for any number of rollers or reduction ratio. FIG. 2D facilitates analysis of the apparatus 216 and relation between parameters that achieve pure, or nearly pure, rolling of the rollers 220A-E.

FIG. 2D illustrates the first ring 200, the second ring 208, and the roller cage 218 as circles or cylinders. The cylinders of the first ring 200 and the second ring 208 define the surfaces that the roller 220A-E make contact with. Thus, these cylinders lie within the grooves or raceways of the first ring 200 and the second ring 208. Each of the first ring 200, the second ring 208, and the roller cage 218 has a corresponding pitch circle that is rigidly and concentrically respectively attached thereto. In FIG. 2D, pitch circle 222 corresponds to the tint ring 200, pitch circle 224 corresponds to the second ring 208, and pitch circle 226 corresponds to the roller cage 218.

The surfaces that define the rings 200 and 208 are described here as cylinders, but they can also be conic sections, where each cross section is a circle. This implementation would be analogous to bevel gear type arrangements.

The three pitch circles 222, 224, and 226 could be defined by a desired reduction ratio to be achieved by the apparatus 216 and an amount of eccentricity between the input shaft and the second ring 208. Specifically, the ratio, of the pitch circle diameters and the ratio of the diameters of the first ring 200, the second ring 208, and the roller cage 218 are equal to the ratio of the integer number of cutouts or rollers that each component has. For example, the ratio between the diameter of the pitch circle 222 and the diameter of the pitch circle 224 is equal to a ratio between the number of cutouts in the first ring 200 and the number of cutouts in the second ring 208. Similarly, the ratio between the diameters of the first ring 200 and the second ring 208 is also equal to the ratio between the number of cutouts in the first ring 200 and the number of cutouts in the second ring 208. As another example, the ratio between the diameter of the pitch circle 222 and the diameter of the pitch circle 226 is equal to the ratio between the number of cutouts in the first ring 200 and the number of rollers coupled to the roller cage 218. Similarly, the ratio between the diameters of the first ring 200 and the roller 218 is also equal to the ratio between the number of cutouts in the first ring 200 and the number of rollers coupled to the roller cage 218.

FIG. 2D represents a snapshot of a dynamic geometric configuration, where the instant center of rotation 228 completes an orbit for each rotation of the input shaft coupled to the transmission 216. The effective diameters of the rollers 220A-E are constantly changing through an orbit. Nonetheless, the above analysis relies on invariant parameters, and thus holds for all configurations through a cycle, and therefore all roller contact points. Referring to FIG. 2D, there appears to be interference between the rollers 220A-E and the first ring 200 and the second ring 208. For instance, a region 238 shown in FIG. 2D appears to be an interference between the roller 220B and the first ring 200. However, the region 238 is not an interference. The region 238 illustrates that the roller 220B sits deeper in a respective groove or cutout (e.g., a cutout of the cutouts 204A-F) in the first ring 200. In other words, the roller 220B happens to be at a point in the groove or cutout that is sufficiently wide, causing the roller 220B to sink deeper in the first ring 200.

In the configuration described above, the rollers 220A-E are shown to have the shape of two cones fused together at their bases. However, this is intended as a non-limiting example embodiment of such rollers in a transmission as described herein. For example, such rollers could be spherical, or could have the shape of two cones fused together at their tips. However, rollers of a transmission as described herein will generally be rotationally symmetric about an axis of rotation.

The eccentric drive transmission 216 could include additional elements and/or be part of some greater apparatus. For example, the eccentric drive transmission 216 could be part of a composite transmission that includes an additional eccentric drive transmission that is driven out of phase with the eccentric drive transmission 216 and that is coupled to the same input and output as the eccentric drive transmission 216. This could be done to provide increased torque capacity for the composite transmission, to reduce torque ripple, to reduce vibration and/or balance the center of mass of the eccentric drive transmission 216 as it operates, or to provide some other benefits.

Figure 3:
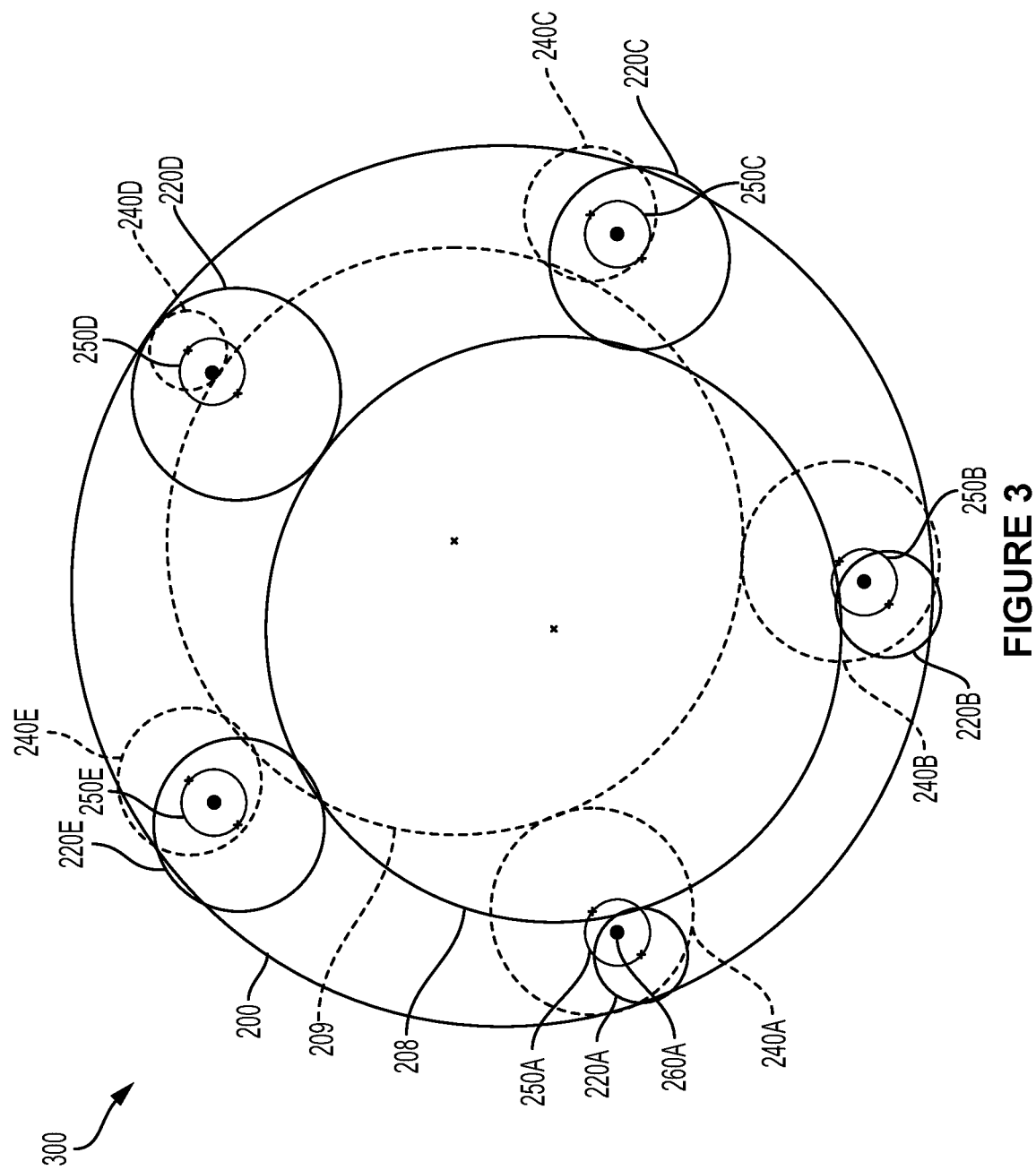
FIG. 3 illustrates a simplified diagram of an apparatus that includes two sets of rollers, driven 180 degrees out of phase, in accordance with an example implementation.

For example, the additional eccentric chive transmission could be driven 180 degrees (or approximately 180 degrees) out of phase with eccentric drive transmission 216. FIG. 3 illustrates, by way of example, elements of such a composite transmission 300. The additional eccentric drive transmission of the composite transmission 300 includes an additional plurality of rollers 240A-E, a third ring (not shown), and a fourth ring (not shown). The third ring is coupled to the first ring 200 and has an open annular space and a series of variable-width cutouts (which may be similar in size and shape to the variable-width cutouts 204A, 204B, 204C, 204D, 204E, and 204F of the first ring 200) that are defined by contact surfaces disposed on an interior peripheral surface of the third ring. The additional eccentric drive transmission also includes a fourth ring 209 that is rotatable within the open annular space of the third ring and that has a respective series of variable-width cutouts (which may be similar in size and shape to the variable-width cutouts 210A, 210B, 210C, and 210D of the second ring 208) that are defined by contact surfaces disposed on an exterior peripheral surface of the fourth ring 209.

Such a configuration could allow the rollers 220A-E of the eccentric drive transmission 216 to be coupled, via respective mid-plane constraining elements 250A-E, to respective rollers 240A-E of the additional eccentric drive transmission. Such mid-plane constraining elements 250A-E can be configured to constrain at least the relative rotation of pairs of rollers about a single axis of rotation (substantially perpendicular to the plane of FIG. 3 and translating along a curved path as the rollers precess). The mid-plane constraining elements 250A-E can be configured to constrain the relative rotation of pairs of rollers about additional exes of rotation and/or to constrain the relative location of pairs of rollers along one or more directions. For example, the mid-plane constraining elements 250A-E can be configured to constrain the relative rotation and location of pairs of rollers with respect to six degrees of freedom. Such constraint(s) may provide a variety of benefits, as described elsewhere herein.

FIG. 3 illustrates the instantaneous axes of rotation (illustrated by filled black dots) of pairs of rollers of the composite transmission 300. The axes of rotational symmetry of the individual rollers are illustrated by '+' symbols. For example, a first roller 220A of the eccentric drive transmission 216 is coupled to a first roller 240A of the additional eccentric drive transmission via a first mid-plane constraining element 250A. The rollers 220A, 250A have respective axes of rotational symmetry ('+') that are offset from each other. However, the configuration of the composite transmission 300 results in the rollers 220A, 250A rotating about the same axis of rotation 260A, thereby allowing the rollers 220A, 250A to be coupled to each other without resulting in over-constraint or slipping of the rollers relative to the respective contact surfaces of the transmission 300.

The eccentric member of a transmission as described herein may be driven by an eccentric cam that is coupled to an input member (e.g., by being fused or otherwise coupled to a shaft of the input member). An output member (e.g., an output shaft) could be coupled to the eccentric member in a variety of ways in order to extract rotation/torque therefrom as a result of application of rotation/torque to the transmission via the input member. For example, a number of pins or posts could be rigidly coupled to the eccentric member (e.g., formed from a single cast or machined piece of material with the eccentric member) and in bearing contact (e.g., via a plurality of needle bearings) with circular holes or pockets in a rectifier plate or other elements) coupled to the output member. Conversely, such pins or posts could be coupled to the output member and disposed within circular holes or pockets in the eccentric member.

In some embodiments, the eccentric member could be coupled to an output member via a set of pins that engage in rolling motion relative to contact surfaces of the eccentric member and the output member (and/or of elements coupled thereto). By coupling the eccentric member and output member together in this manner (via rolling motion), the efficiency power capacity, and lifetime of the transmission can be increased or other benefits provided.

Figure 4:
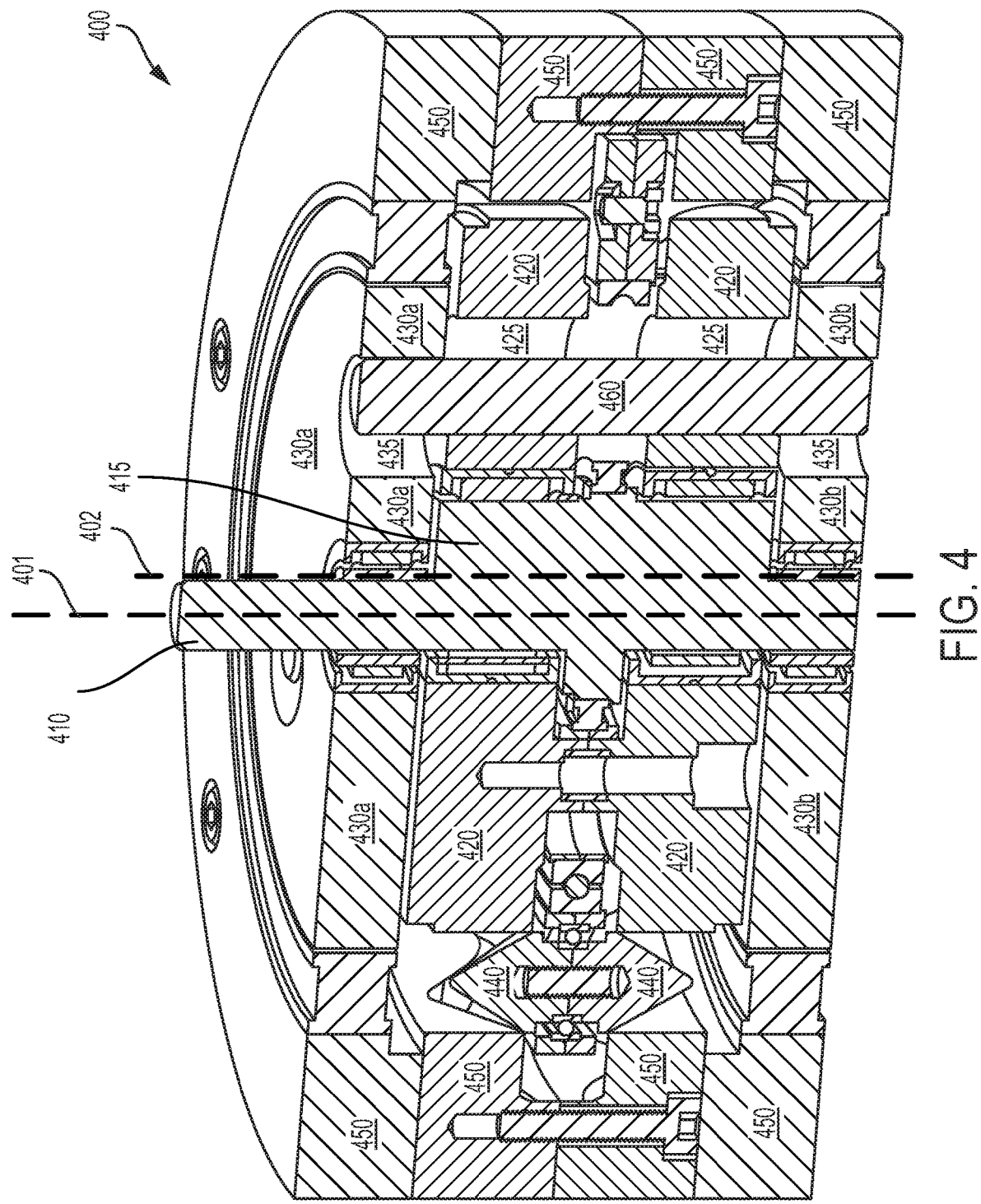
FIG. 4 is a cutaway perspective view of an example transmission.

FIG. 4 illustrates, in cutaway perspective view, an example of a transmission 400 configured in such a manner. The transmission 400 includes an input member that includes a shaft 410 and a cam 415 coupled thereto, an eccentric member 420, and an output member that includes opposite first 430a and second 430b plates, and a third member that frictions as an input of the transmission and that includes an input shaft 410 and a cam 415. The first 430a and second 430b plates may be bolted together or otherwise rigidly coupled together. The input shaft 410, cam 415, and the first 430a and second 430b plates of the output member rotate about a first axis of rotation 401 and the eccentric member 420 rotates about a second axis of rotation 402. The axes of rotation 401, 402 are substantially parallel and offset from each other by a non-zero distance.

The eccentric member 420 is coupled to the output member 430a/430b via a set of pins 460 such that a rotation/torque is transmitted to the output member 430a/430b from the input member 410 (and vice versa) via the eccentric member 420. The eccentric member 420 and output member 430a/430b include cylindrical contact surfaces 425 and 435, respectively, with which the pins 460 are in contact and relative to which the pins 460 engage in rolling motion (e.g., substantially pure rolling motion).

Note that reference is made throughout this disclosure to input members, eccentric members, output members, and ground members, with transmissions incorporating such features generally being described as receiving rotational input via the input members, providing rotational output via the output members, and mechanically grounding the ground members. However, these embodiments are intended as non-limiting examples for illustrative purposes. One of skill in the art will appreciate that the function of input, output, and wound may be assigned to the various elements of the transmissions described herein in a variety of way according to an application. For example, an "input member" of one of the embodiments herein (e.g., the input member of transmission 400 depicted in FIG. 4) may be mechanically grounded, with the "output member" used as a mechanical input to the transmission and the "ground member" mechanically un-grounded and used as a mechanical output from the transmission. Further, a transmission as described herein may be configured to transmit mechanical power or torque bidirectionally, from input to output and from output to input. For example, a transmission as described herein could be used to couple a motor-generator of an electrical vehicle to wheels of the vehicle such that the transmission is, during a first period of time, used to transmit motive power from the motor-generator to the wheels and, during a subsequent second period of time, to extract motive power from the wheels as part of a regenerative braking scheme.

Further, the term "member" (e.g., as in "input member") is intended to have a broad meaning unless otherwise indicated. While such members may be illustrated by way of example herein as singular cast, machined, of otherwise formed plates or otherwise-shaped elements, it is intended that a "member" may include multiple elements bolted, welded, screwed, clipped, or otherwise fastened together. The multiple elements of a "member" may be bolted or otherwise fastened together such that they are in intimate contact (e.g., such that large surfaces of such multiple elements of a single "member" are in contact) or may be fastened together via intermediate additional elements of the member (e.g., via a set of rods, pins, cylinders, or screws that may pass through corresponding holes in some intervening member or other element of a transmission).

III. Example Parallel Transmissions

The transmissions described above, having shaped rollers that exhibit rolling motion (e.g., substantially pure rolling motion) relative to contact surfaces, of eccentric and ground members of the transmission, that define variable-width cutouts, provide a variety of benefits relative to other transmissions. These benefits can include increased efficiency, reduced component wear, increased service lifetime, increased torque and/or power capacity, reduced size and/or weight, reduced backlash, or other benefits. Additional benefits can be realized by providing two or more such transmissions, configured in parallel between an input and an output as part of a combined transmission. Such benefits can include increased power/torque capacity, increased lifetime, or other benefits. Additional benefits can be obtained by, for example, setting the phase of the different transmissions relative to each other (e.g., by setting corresponding angles of cams used to drive the eccentric members of the transmissions) in order to reduce torque ripple, reduce translational or rotational wobble, or to provide some other benefits.

For example, two transmissions of such a combined transmission could be driven with opposite phases (e.g., the eccentric members of the transmissions could be driven through respective eccentric motions that are between 170 and 190 degrees out of phase, or between 179 and 181 degrees out of phase). This can have the effect of the motion of the masses of the eccentric members, cams, shaped rollers, and/or other elements of the two transmissions partially or totally canceling each other out reducing or eliminating time-varying inertial forces/torques (which may be referred to as "wobble") that are generated by the operation of the two combined transmissions.

Figure 5A:
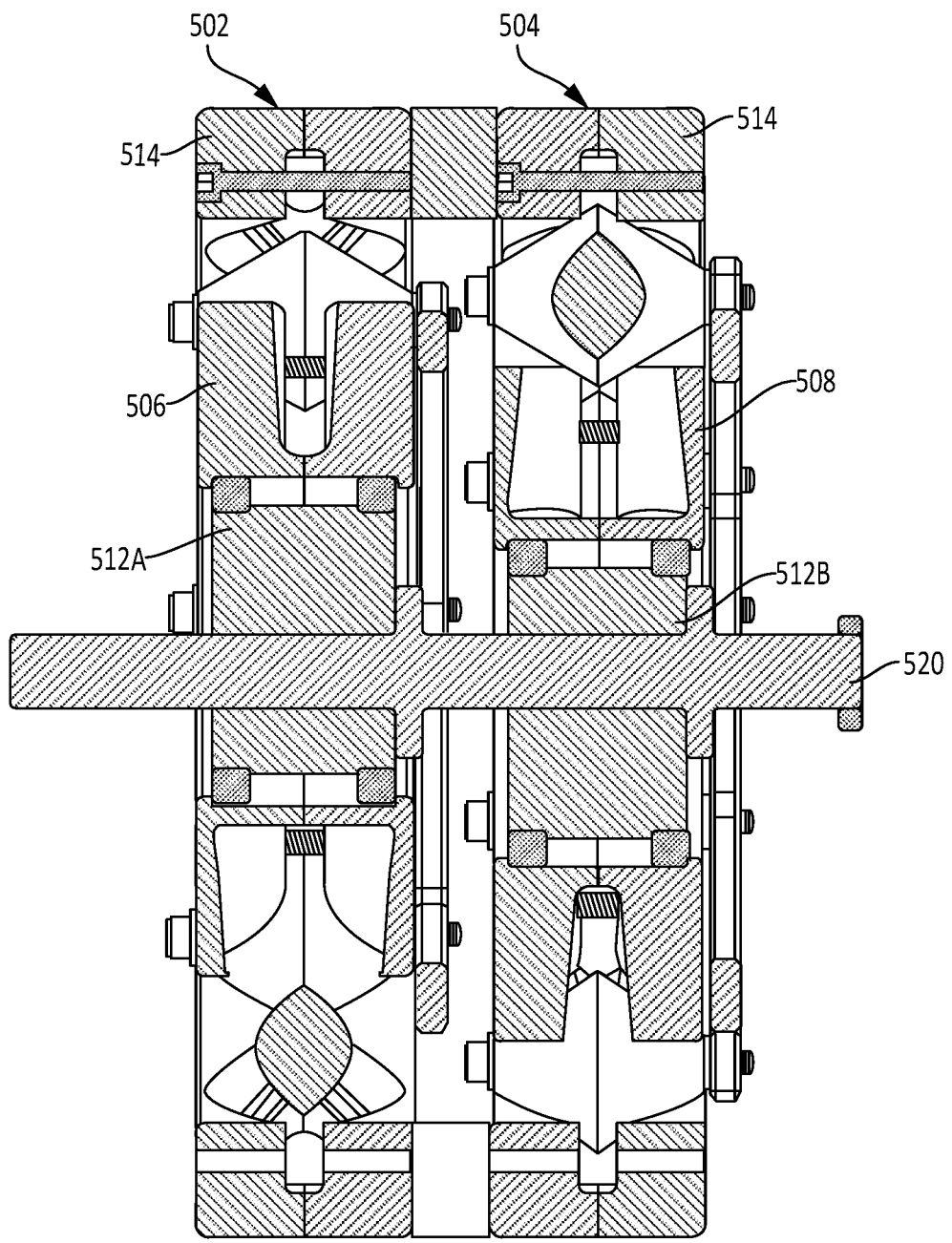
FIG. 5A illustrates, in cross-section, two sub-transmissions connected in parallel and offset relative to each other, in accordance with an example implementation.

FIG. 5A illustrates the two transmissions 502 and 504 connected in parallel with the first transmission 502 being offset relative to the second transmission 504, in accordance with an example implementation. The first 502 and second 504 transmissions have respective first 506 and second 508 eccentric members and share a mechanical ground 514. The transmissions 502, 504 are driven by respective first 512A and second 512B cams that are coupled to an input shaft 520. The cams are offset relative to each other by an angle between 170 and 190 degrees (e.g., an angle between 179 and 181 degrees). Accordingly, the eccentric members 506, 508 engage in respective eccentric motions that are out of phase by a corresponding amount. The eccentric members 506, 508 could be coupled to a single output or could be coupled to respective different outputs.

An advantage of such out-of-phase parallel transmissions 502, 504 is that the eccentricity of the first transmission 502 is canceled or compensated for by the respective eccentricity of the second transmission 504. Note that, while this arrangement may fully or partially cancel translational "wobble" due to the eccentric motions of the elements of the two transmissions, such an arrangement may still exhibit rotational "wobble" due to the eccentric motions of the transmissions being in parallel planes that are separated by a non-zero distance.

Figure 5B:
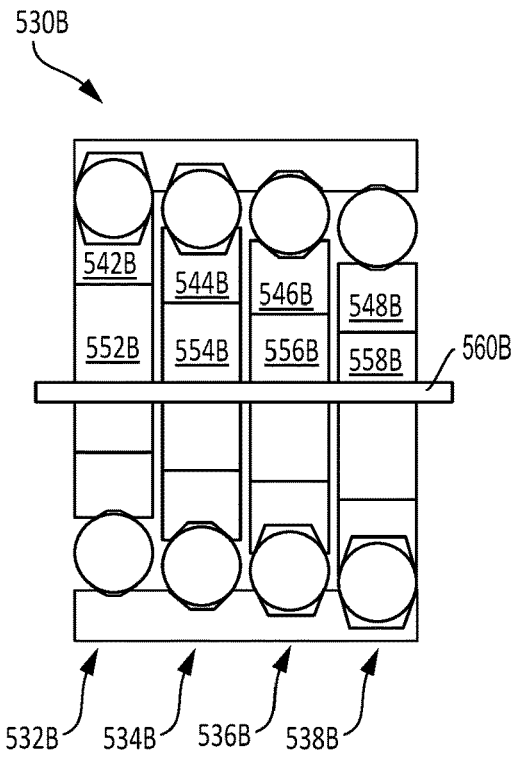
FIG. 5B illustrates, in cross-section, four sub-transmissions connected in parallel and offset relative to each other, in accordance with an example implementation.

Additional transmissions (e.g., more than two transmissions) could be combined into a single combined transmission to provide additional or alternative benefits. For example, such a combined transmission could include a set of three or more parallel transmissions that are substantially equally offset with respect to phase so as to reduce torque ripple in the operation of the combined transmission. FIG. 5B shows an example of such a combined transmission 530B that includes first 532B, second 534B, third 536B, and fourth 538B transmissions configured in parallel. Each of the transmissions 532B, 534B, 536B, 538B includes a respective eccentric member 542B, 544B, 546B, 548B that is driven through a respective eccentric motion by a respective cam 552B, 554B, 556B, 558B. The cams 552B, 554B, 556B, 558B are coupled to an input shaft 560B at respective different angles such that their corresponding eccentric members 542B, 544B, 546B, 548B engage in respective eccentric motions that are out of phase by corresponding amounts. Accordingly, the angles of the cams 552B, 554B, 556B, 558B relative to each other could be set so as to reduce an amount of torque ripple exhibited by the combined transmission 530B. For example, the angles (and the corresponding phases of the eccentric motions of the eccentric members) could be substantially even spaced apart (e.g., at 90, 180, and 270 degrees relative to a particular one of the cams that is, by definition, at 0 degrees).

Additionally or alternatively, the phasing of multiple transmissions within a combined transmission could be set so as to reduce or eliminate time-varying inertial forces or torques (which may be referred to as "wobble") exhibited by the combined transmission during operation. For example, two transmissions (or a single transmission configured to behave, inertially, as though it was two transmissions, e.g., by including a ballast such that its mass is equivalent to two transmissions) could be disposed between two additional transmissions and driven out of phase (e.g., between 170 and 190 degrees) from the additional two transmissions. This can have the effect of reducing or wholly canceling the "wobble," both translational and rotational, that may occur when such a combined transmission is operated.

Figure 5C:
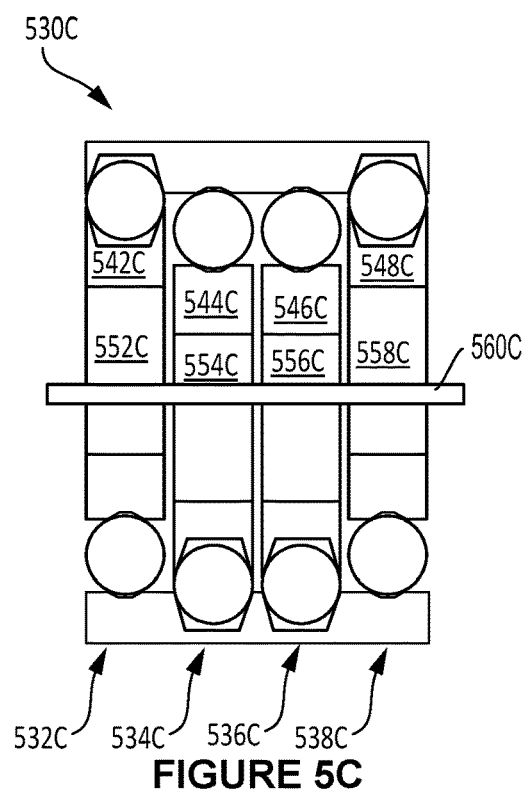
FIG. 5C illustrates, in cross-section, four sub-transmissions connected in parallel and offset relative to each other, in accordance with an example implementation.

FIG. 5C shows an example of such a combined transmission 530C that includes first 532C, second 534C, third 536C, and fourth 538C transmissions configured in parallel. Each of the transmissions 532C, 534C, 536C, 538C includes a respective eccentric member 542C, 544C, 546C, 548C that is driven through a respective eccentric motion by a respective cam 552C, 554C, 556C, 558C. The cams 552C, 554C, 556C, 558C are coupled to an input shaft 560C at respective different angles such that their corresponding eccentric members 542C, 544C, 546C, 548C engage in respective eccentric motions that are out of phase by corresponding amounts. The angles of the cams are set such that the first 532C and fourth 538C transmissions are driven in-phase relative to each other, while the second 534C and third 536C transmissions are driven in-phase relative to each other but out of phase (e.g., between 170 and 190 degrees, or between 179 and 181 degrees) with the first 532C and fourth 538C transmissions.

Such a reduction or cancellation of "wobble" could also be achieved in a two-transmission combined transmission by "splitting" one of the transmissions into two separate "half-transmissions" located on opposite sides of the other one of the two transmissions. The eccentric members of the two half-transmissions could be mechanically coupled together via rod or other members that extend through corresponding apertures formed through the eccentric member of the middle transmission.

Figure 5D:
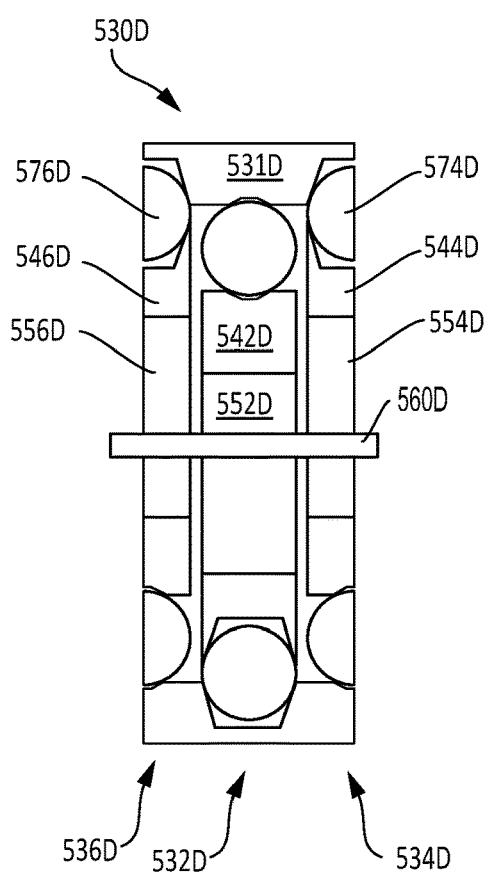
FIG. 5D illustrates, in cross-section, two sub-transmissions connected in parallel and offset relative to each other, in accordance with an example implementation.

FIG. 5D shows an example of such a combined transmission 530D that includes a first transmission 532D and first 534D and second 536D half-transmissions configured in parallel. Each of the transmissions 532D, 534D, 536D includes a respective eccentric member 542D, 544D, 546D that is driven through a respective eccentric motion by a respective cam 552D, 554D, 556D. The cams 552D, 554D, 556D are coupled to an input shaft 560D at respective angles such that their corresponding eccentric members 542D, 511D, 546D engage in respective eccentric motions, with the first 534D and second 536D half-transmissions in phase with each other and out of phase with the first transmission 532D. Reaction forces exerted on the half-rollers (e.g., 574D and 576D) of the first 534D and second 536D half-transmissions by the ground 531D of the transmission 530D and the eccentric members 544D, 546D of the half-transmissions 534D, 536D may be accounted for by coupling the half-rollers together with a rod or other member in tension. Such a tension member may be shaped or otherwise configured to provide additional benefits, e.g., to constrain a relative location and/or rotation of a corresponding roller of the first transmission 532D.

Power could be extracted from the multiple eccentric members to an output member of such combined transmissions in a variety of ways, e.g., via mechanisms similar to those described above in relation to single transmissions. In some embodiments, the eccentric members of the multiple transmissions could be coupled to an output member via a set of pins that engage in rolling motion relative to contact surfaces of the eccentric members and that engages with the output member via needle bearings or some other variety of bearing (e.g., a sleeve bearing or direct contact between the output member and the pins). By coupling the eccentric members and output member together in this manner (via rolling motion relative to surfaces of the eccentric members), the efficiency, power capacity, and lifetime of the transmission can be increased or other benefits provided.

Figure 5E:
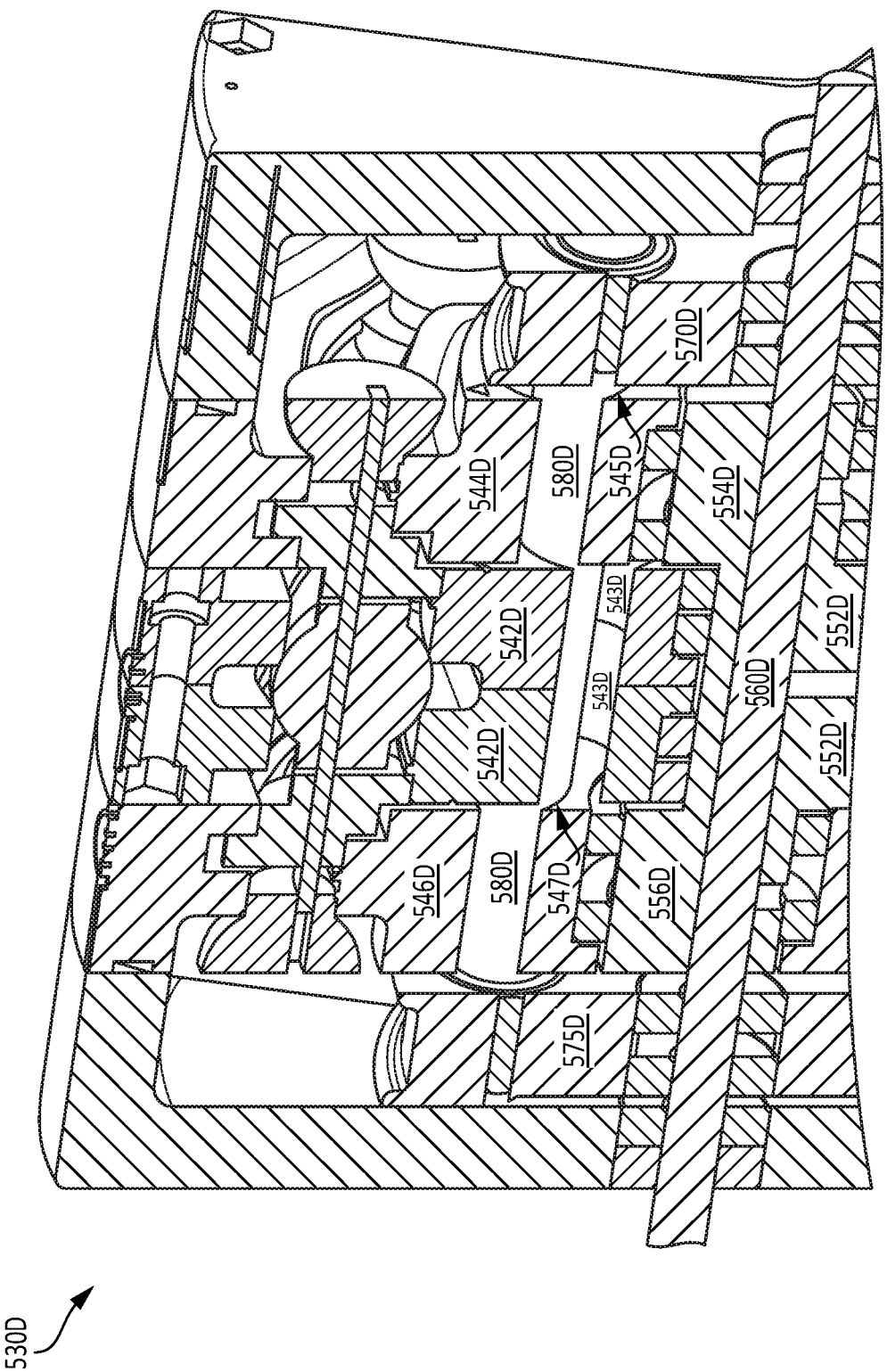
FIG. 5E illustrates, in a cutaway perspective view, two sub-transmissions connected in parallel and offset relative to each other, in accordance with an example implementation.

FIG. 5E illustrates, in cutaway perspective view, an example of the example transmission 530D of FIG. 5D configured in such a manner. The eccentric members 542D, 544D, 546D of the first transmission 532D and first 534D and second 536D half-transmissions coupled to first 570D and second 575D plates of an output member via a set of pins 580D such that a rotation/torque is transmitted to the output member 570D/575D from the input member 560D (and vice versa) via the eccentric members 542D, 544D, 546D. The eccentric members 542D, 511D, 546D include cylindrical contact surfaces 543D, 545D, and 547D, respectively, with which the pins 580D are in contact and relative to which the pins 580D engage in rolling motion (e.g., substantially pure rolling motion). The pins 580D are coupled to the output member 570D/575D via needle bearings or some other variety of bearing.

IV. Example Mid-Plane Constraining Elements

A variety of transmissions having shaped rollers in rolling motion contact with corresponding variable-width contact surface cutouts are described herein. The performance of such transmissions can be related to the behavior of the shaped rollers, e.g., to the degree to which they engage in pure rolling motion relative to the variable-width contact surfaces. Due to manufacturing tolerances, wear and tear, the presence of dust, grit, or metallic particles, mechanical singularities at which the shaped rollers are over- or under-constrained in space, or other factors, the shaped rollers may become misaligned, or even bind within the transmission, leading to inefficiency, damage, or other unwanted effects.

These effects can be mitigated in a variety of ways, e.g., by introducing additional elements in the transmission to ensure that the shaped rollers rotate and translate within the transmission in a desired manner. For example, a cage could be added to maintain the location of the shaped rollers relative to each other (e.g., the shaped rollers could be in contact with the cage via needle bearings or some other variety of bearing). Such a cage may be maintained in place by reaction forces from the shaped rollers (e.g., based on a sum of the reaction forces experienced by all of the shaped roller sin contact with the cage). Additionally or alternatively, such a cage may include shaped contact surfaces configured to be in rolling motion contact with corresponding contacts surfaces of ground members, eccentric members, output members, or other components of the transmission so as to maintain the cage, and the shaped rollers coupled thereto, along a desired trajectory within the transmission.

A combined transmission composed of multiple individual transmissions as described herein contains a respective set of shaped rollers for each of the individual transmissions of the combined transmission. When two neighboring transmissions of such a combined transmission are driven at certain relative phases to each other (e.g., driven such that eccentric members of the neighboring transmissions engage in respective eccentric motions that are between 170 and 190 degrees, or between 179 and 181 degrees, out of phase with each other), the relative location and orientation of adjacent shaped rollers of the neighboring transmissions could be coupled to each other, via mid-plane constraining elements, such that the orientation and/or location of the adjacent shaped rollers are constrained with respect to at least one degree of freedom. Such a constraint could facilitate maintaining the shaped rollers along desirable orientation and/or location trajectories as they move within the transmission. Benefits of such a configuration can include maintaining the location and/or orientation of a shaped roller along a desired trajectory while the shaped roller passes through an under- or over-constrained region of its trajectory. This benefit could be achieved by the shaped roller receiving corrective forces/torques from the adjacent shaped roller to which it is coupled and/or from the mid-plane constraining element via which it is coupled to the adjacent shaped roller.

Corresponding shaped rollers of two (or more) parallel transmissions may be constrained, by a mid-plane constraining element, with respect to one or more (e.g., all six) of the degrees of freedom defining the relative location and rotation of the corresponding shaped rollers. For example, the mid-plane constraining element could be a rigid element to which both of the corresponding shaped rollers are fused or otherwise rigidly coupled such that the relative location and orientation of the corresponding shaped rollers are fully constrained in all six degrees of freedom. In another example, the mid-plane constraining could be configured such that the rotation of the shaped rollers relative to each other about a first axis (e.g., an axis parallel to an axis of rotational symmetry of the shaped roller(s)) is constrained while rotation about the remaining two axes and relative motion in three dimensions is relatively unconstrained. Such a mid-plane constraining element could include two or more shaped surfaces that are coupled to respective shaped rollers and that are in contact, via their shaped surfaces with each other and/or with one or more intervening elements, such that the above single-degree-of-freedom constraint is achieved.

Figure 6A:
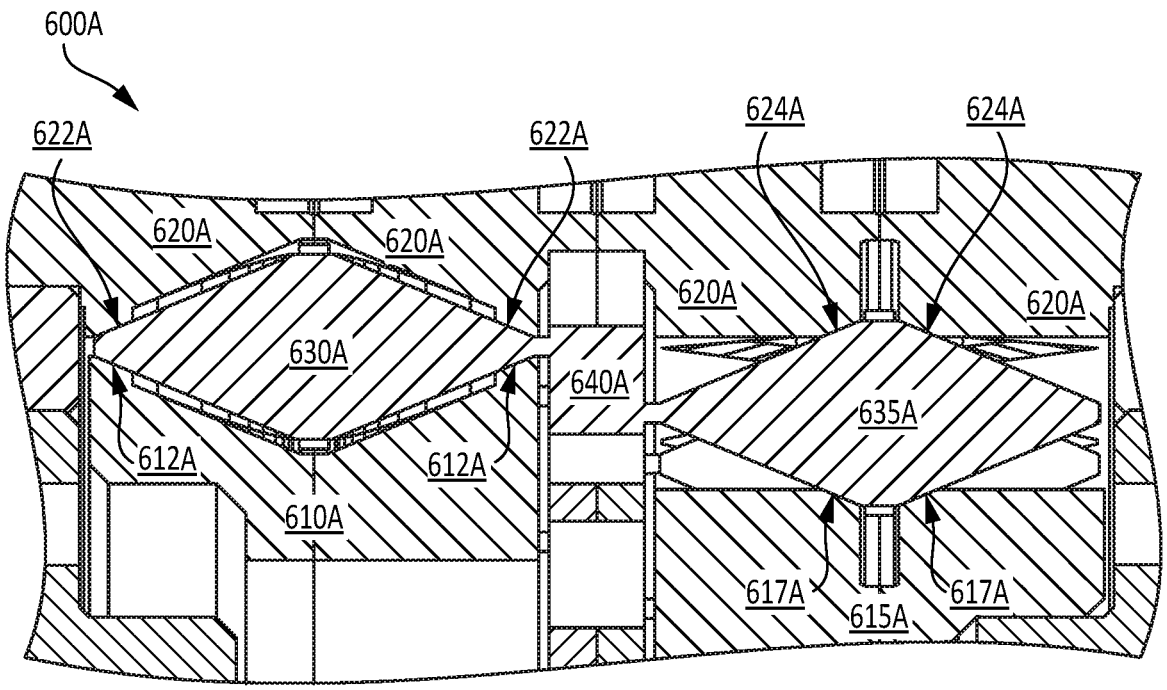
FIG. 6A illustrates, in cross-section, rollers and other elements of two sub-transmissions connected in parallel and offset relative to each other, in accordance with an example implementation.

FIG. 6A illustrates, in cutaway perspective view, an example combined transmission 600A that includes a mid-plane constraining element 640A as described herein. The transmission 600A includes a first eccentric member 610A that is driven through an eccentric motion that is out of phase (e.g., between 170 and 90 degrees, or between 179 and 181 degrees) with an eccentric motion of a second eccentric member 615A. The first eccentric member 610A is in rolling motion contact, via shaped contact surfaces 612A that define variable-width cutouts, with a first set of shaped rollers (including shaped roller 630A) that are, in turn, in rolling motion contact, via shaped contact surfaces 622A that define variable-width cutouts, with a mechanical ground 620A. The second eccentric member 615A is in rolling motion contact, via shaped contact surfaces 617A that define variable-width cutouts, with a second set of shaped rollers (including shaped roller 635A) that are, in turn, in rolling motion contact, via shaped contact surfaces 624A that define variable-width cutouts, with the mechanical ground 620A.

Corresponding shaped rollers 630A and 635A are coupled to each other via a mid-plane constraining element 640A. As shown, the shaped rollers 630A, 635A are rigidly coupled to the mid-plane constraining element 640A, resulting in the relative location and orientation of the shaped rollers 630A, 635A being constrained with respect to all six degrees of freedom. The shaped rollers 630A, 635A could be separate elements that are welded, bolted, fused, or otherwise rigidly coupled to the mid-plane constraining element 640A. Alternatively, some or all of the shaped rollers 630A, 635A and the mid-plane constraining element 640A could be a single continuous piece or material, e.g., could be cast together as a single piece of material, could be machined from a single piece of material, etc.

The example shaped rollers 630A, 630B of FIG. 6A have "diamond" cross sections, and may be described as having the shape of paired cones. Other shapes of shaped rollers are possible, e.g., spheres as depicted in FIG. 5E. In some examples, the rolling-motion contact surfaces of such shaped rollers may be "outward-facing," i.e., the rolling-motion contact surfaces may be directed away from each other. This is the case for the sphere and double-cone shaped rollers. Such shaped rollers, having outward-facing contact surfaces, will be subject to compressive forces when used in a transmission as described herein. However, it can be beneficial in some applications to use shaped rollers having inward-facing rolling motion contact surfaces. Such shaped rollers, having inward-facing contact surfaces, will be subject to tension forces when used in a transmission as described herein. This may be beneficial, e.g., in embodiments where it is desired that an eccentric member and/or ground member of the transmission maintain a compressive force between its shaped roller-contacting surfaces (rather than a tension force). Note that such inward-facing shaped rollers may provide benefits in single transmissions or in combined transmissions that include multiple such single transmissions in parallel.

Figure 6B:
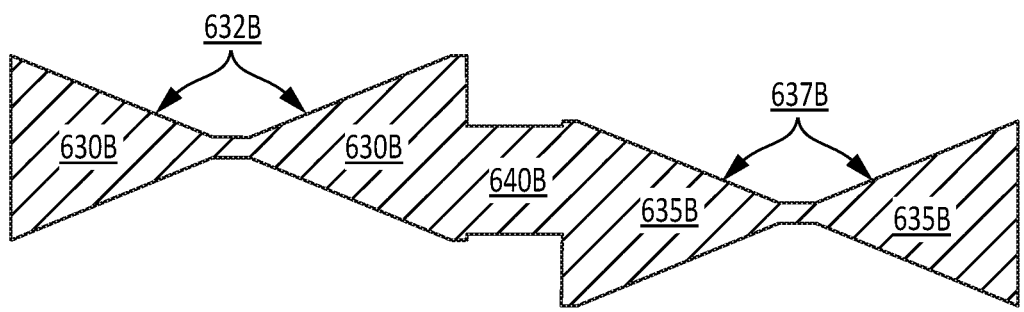
FIG. 6B illustrates, in cross-section, rollers and other elements of two sub-transmissions connected in parallel and offset relative to each other, in accordance with an example implementation.

One possible benefit of such shaped rollers, having inward-facing contact surfaces, is to provide additional surface area at the ends of the rollers for coupling the rollers to each other and/or to a mid-plane constraining element. FIG. 6B shows, in cross-section, a first shaped roller 630B coupled, via a mid-plane constraining element 640B, to a second shaped roller 635B. Each of the shaped rollers 630B, 635B has a "bowtie" cross-section and so has respective inward-facing contact surfaces 632B, 637B via which the shaped rollers 630B, 635B may engage in pure rolling motion relative to corresponding shaped contact surfaces of eccentric members, ground members, or other elements of a transmission as described herein.

A mid-plane constraining element could have a rigidity that is less than the shaped rollers to which it is coupled. This may prevent binding of the shaped rollers by allowing the mid-plane constraining element to elastically deform, allowing the shaped roller(s) to avoid binding in the transmission.

A mid-plane constraining element could be configured in a variety of ways to constrain the relative location and/or orientation of two shaped roller with respect to one or more degrees of freedom. For example, the mid-plane constraining element may include a tension rod that passes through a corresponding hole or aperture in a first shaped roller while coupling together, and maintaining tension between, half-rollers of a split shaped roller that are located on opposite sides of the first shaped roller. The rod and corresponding hole or aperture could have corresponding cross-sectional shapes so as to constrain the relative location and orientation of the first shaped roller and the half-rollers with respect to five degrees of freedom (all rotational degrees of freedom and two translational) while allowing the first shaped roller and the half-rollers of the split shaped roller to translate, unconstrained, along the long axis of the tension rod.

Figure 7:
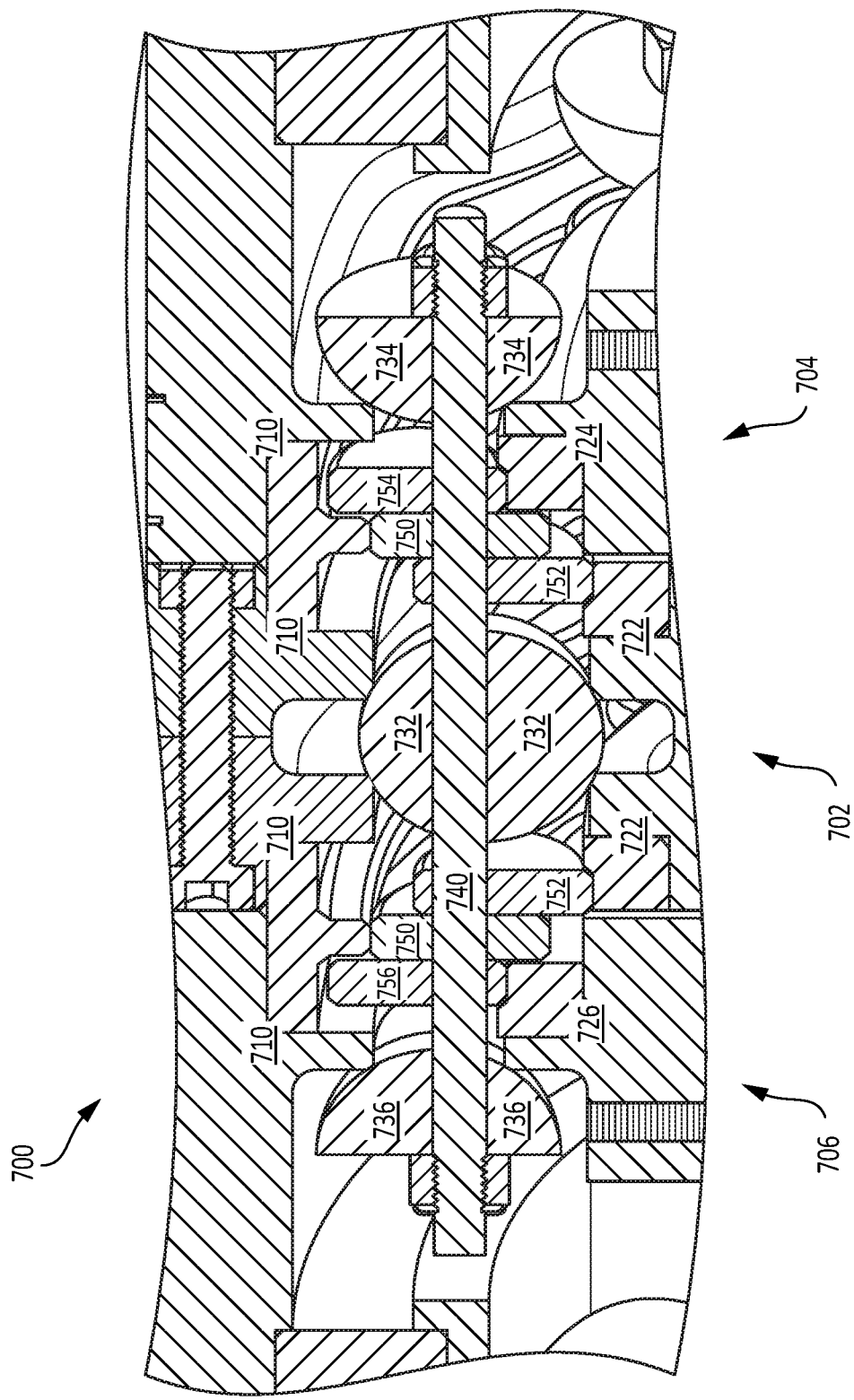
FIG. 7 illustrates, in a cutaway perspective view, rollers and other elements of two sub-transmissions connected in parallel and offset relative to each other, in accordance with an example implementation.

Such an embodiment is depicted by way of example in FIG. 7. FIG. 7 depicts, in cutaway perspective view, elements of a combined transmission 700 that includes a first transmission 702 located between first 704 and second 706 half-transmissions, all of which are coupled in parallel to a common input and output (not shown). The first transmission 702 includes a first eccentric member 722 and a plurality of shaped rollers 732 that engage in rolling motion (e.g., substantially pure rolling motion) relative to shaped contact surfaces of the first eccentric member 722 and of a ground member 710 of the transmission 700. The first 704 and second 706 half-transmissions include respective second 724 and third 726 eccentric members and respective first 734 and second 736 pluralities of half-rollers that engage in rolling motion (e.g., substantially pure rolling motion) relative to shaped contact surfaces of the second eccentric member 724 and third eccentric member 726, respectively, and relative to shaped contact surfaces of the ground member. The transmission 700 also includes a mid-plane constraining element that includes a tension rod 740 that maintains tension between the half-rollers 734, 736 and that passes through a corresponding shaped hole or aperture in the shaped roller 732 of the first transmission 702.

A mid-plane constraining element could be configured to maintain the absolute or relative location and orientation of the shaped rollers relative to a ground or other elements of a transmission. For example, the relative locations of the shaped rollers could be maintained by a cage coupled to the mid-plane constraining elements that maintains the locations of the mid-plane constraining elements relative to each other and/or to a wound or other elements of a transmission. Such a cage could be provided in addition or alternative to cage(s) configured to maintain the location of sets of shaped rollers relative to each other and/or to other elements of the transmission.

Additionally or alternatively, the mid-plane constraining elements could include rollers or other shaped elements in geared contact and/or pure rolling contact with corresponding contact surfaces of eccentric members, ground members, or other elements of a transmission. Such a geared or rolling contact could be provided to maintain the relative angular phasing of the shaped rollers to as to prevent binding, to increase efficiency, to ensure the rollers comport with a desired translational and rotational trajectory through portions of the trajectory where the shaped roller alone would be under-constrained, and/or to provide some other benefit.

Such features are illustrated by way of example in FIG. 7. The mid-plane constraint element depicted in FIG. 7 includes, in addition to the tension rod, a number of rollers 750, 752, 754, 756 that are in contact with corresponding contact surfaces of the transmission such that the rollers 750, 752, 754, 756 engage in rolling motion (e.g., substantially pure rolling motion) relative to the contact surface when the transmission is in operation. First rollers 750 are in contact with contact surfaces of the ground member 710 of the combined transmission 700. Second 752, third 754, and fourth 756 rollers are in contact with respective contact surfaces of respective first 722, second 724, and third 726 eccentric members of the combined transmission 700. Such rolling motion contact can help to maintain the correct rotational phasing of the rollers and/or of the eccentric member of the combined transmission 700. Note that, while the rollers depicted in FIG. 7 are in rolling motion contact with corresponding contact surfaces, such elements of a mid-plane constraint element as described herein may be additionally or alternatively in geared contact with elements of such a transmission or in some other form of contact so as to assist in maintaining the rotational phases of shaped rollers, eccentric members, or other elements of such a transmission.

Note also that such rollers of a mid-plane constraining element may provide additional or alternative benefits. For example, such rollers may transmit loads from the eccentric members into the ground of a transmission so as to reduce the need for alternative bearing surfaces in the transmission, to increase the efficiency of the transmission, to reduce the cost of the transmission, to shorten load paths through the transmission, or to provide other benefits to such a transmission.

Note further that, while FIG. 7 depicts a mid-plane constraining element having rollers in contact with the round member and each of the eccentric members of the combined transmission 700 depicted therein, this is intended only as a non-limiting example embodiment. It is anticipated that such a mid-plane constraining element may include any subset of such rollers according to an application. For example, such a mid-plane constraining element may only include rollers in contact with the ground member of the transmission, or may only include rollers in contact with one or more of the eccentric members of the transmission.

V. Example Planetary Drive of Eccentric Member(s)

In the transmission described above, individual eccentric members are coupled to an input (or output, or mechanical ground) by a single cam such that the eccentric member engages in an eccentric motion in response to rotation of the input. However, such an eccentric member of a transmission may be driven by multiple cams provided in a planetary arrangement. Each such cam could be coupled to a respective gear and driven, via the gear, by a sun gear coupled to an input shaft or other member. Such a configuration of a transmission could provide a variety of benefits, e.g., by distributing the input load amongst multiple cams, by the planetary gearset providing additional increase or decrease to the transmission ratio of the transmission, or some other benefit.

Figure 8B:
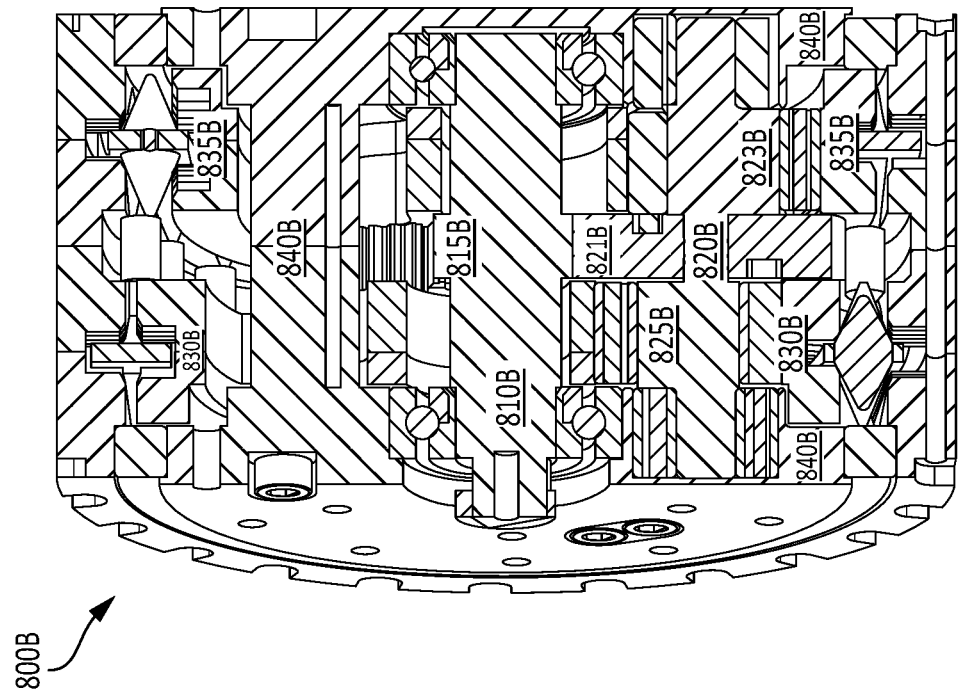
FIG. 8B illustrates, in a cutaway perspective view, two sub-transmissions connected in parallel and offset relative to each other, in accordance with an example implementation.
Figure 8A:
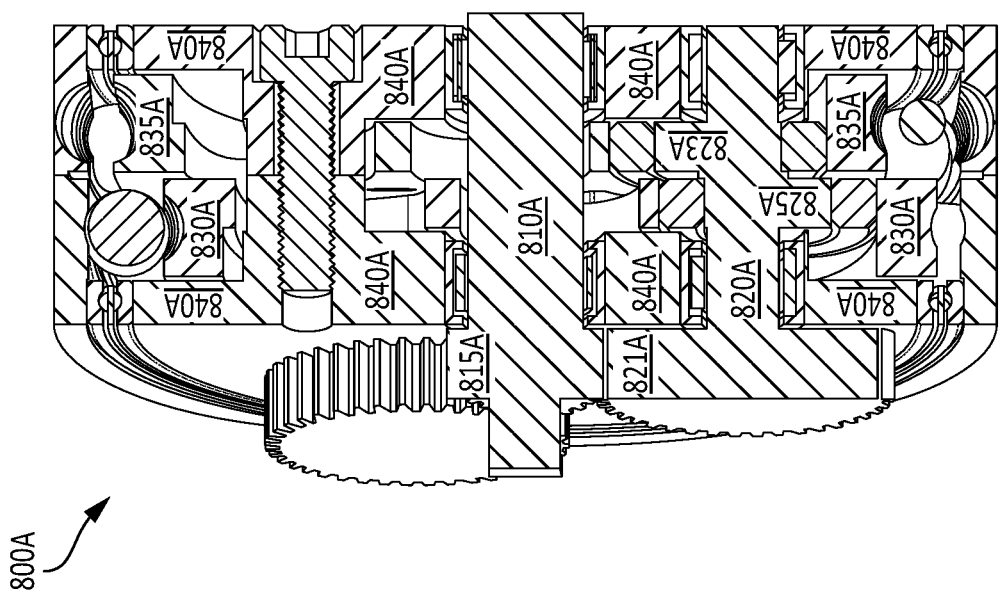
FIG. 8A illustrates, in a cutaway perspective view, two sub-transmissions connected in parallel and offset relative to each other, in accordance with an example implementation.

FIG. 8A shows an example of such a transmission 800A, which includes two sub-transmissions driven in parallel and out-of-phase. The transmission 800A includes an input member 810A having coupled thereto a sun gear 815A such that rotation of the input member 810A results in rotation of the sun gear 815A. The sun gear 815A is in geared contact with a number of planet gears 821A that are each coupled to a respective axle 820A. Each axle 820A is also coupled to a set of cams 825A, 823A that are in contact with respective eccentric members 830A, 835A. An output of such a transmission may be coupled to the eccentric members in a variety of ways (e.g., as described elsewhere herein) to facilitate transmission of torque and/or power through the transmission. As shown in FIG. 8A, an output member 840A of the transmission 800A is coupled to the eccentric members 830A, 835A via the axles 820A. Each axle 820A is in contact with the output member 840A via needle bearings or some other variety of bearing.

Note that, while claim 8A depicts the use of a set of planetary cams to drive eccentric members of a combined transmission having two full sub-transmissions side-by-side therein, such a set of planetary cams could be applied to drive a single or multiple transmission configured in other ways, e.g., any of the configurations of single or multiple transmission depicted in FIGS. 2C-D, 3, 4, 5A-E, 6A, or 7.

The planetary gears of the transmission 800A of FIG. 8A are located "distally" relative to the cams of the transmission (that is, not between the cams). This arrangement may provide a variety of benefits, e.g., by reducing the cost of the transmission and/or by making it easier to assemble and/or service the transmission. However, it may be beneficial in some applications to place the planetary gears between the cams. This may be done, e.g., to balance the loads transmitted from the planetary gears, to shorten load paths within the transmission, to reduce the number of bearings on the axle under significant loading and/or to reduce the magnitude of that loading, or to provide some other benefit.

FIG. 8B depicts a transmission 800B configured in such a manner. The transmission 800B includes an input member 810B having coupled thereto a sun gear 815B such that rotation of the input member 810B results in rotation of the sun gear 815B. The sun gear 815B is in geared contact with a number of planet gears 821B that are each coupled to a respective axle 820B. Each axle 820B is also coupled to a set of cams 825B, 823B that are located on either side of the planetary gear 821B and that are in contact with respective eccentric members 830B, 835B. An output member 840B of the transmission 800B is coupled to the eccentric members 830B, 835B via the axles 820B. Each axle 820B is in contact with the output member 840B via needle bearings or some other variety of bearing.

VI. Conclusion

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

Additionally, reference is made throughout to "mid-plane constraining elements" that are configured to constrain, with respect to at least one degree of freedom, the relative rotation and/or location of rollers of transmissions or other mechanisms described herein. Sets of such "mid-plane constraining elements" are generally described herein as being disposed along a common plane that is location between two or more sub-transmissions of a composite transmission. However, this is intended as a non-limiting example embodiment. Constraining elements, that are part of sets of such constraining elements, may be disposed on multiple different planes (e.g., alternating constraining elements may be disposed on respective different planes) that may or may not be disposed between sub-transmissions of a composite transmission. The term "mid-plane constraining element" is used herein in a non-limiting manner, and may describe constraining elements that are not disposed on a plane located between sub-transmissions of a composite transmission and/or that are part of sets of such constraining elements that are not all disposed along a single plane (e.g., that are disposed, alternatingly, along two different planes).

What is claimed is:

1. A transmission comprising:
    a sun gear;
    an input member coupled to the sun gear such that rotation of the input member results in rotation of the sun gear;
    two or more planet gears that are in geared contact with the sun gear;

two or more cams, each one of the two or more cams being coupled to a respective one of the two or more planet gears such that rotation of the sum gear results in rotation of each of the two or more cams;

an eccentric member that is coupled to the two or more cams such that rotation of the two or more cams results in eccentric motion of the eccentric member, wherein the eccentric member has two contact surfaces that define a series of variable-width cutouts;

a ground member that has at least two contact surfaces that define a series of variable-width cutouts;

an output member coupled to the eccentric member such that rotation of the eccentric member results in rotation of the output member; and a plurality of rollers, each roller of the plurality of rollers being in contact with the contact surfaces of the eccentric member and the ground member such that rotation of the input member results in rotation of the eccentric member, whereby the rotation of the input member causes rotation of the output member.

2. The transmission of claim 1, further comprising:

two or more additional cams, each one of the two or more additional cams being coupled to a respective one of the two or more planet gears such that rotation of the sun gear results in rotation of each of the two or more additional cams;

an additional eccentric member that is coupled to the two or more additional cams such that rotation of the two or more additional cams results in eccentric motion of the additional eccentric member, wherein the additional eccentric member has two contact surfaces that define a series of variable-width cutouts, and wherein the ground member has at least two additional contact surfaces that define an additional series of variable-width cutouts; and a plurality of additional rollers, each roller of the plurality of additional rollers being in contact with the contact surfaces of the additional eccentric member and the at least two additional contact surfaces of the ground member such that rotation of the input member results in rotation of the additional eccentric member, whereby the rotation of the input member causes rotation of the output member.

3. The transmission of claim 2, wherein a particular planet gear of the two or more planet gears is located between the cam of the two or more cams and the cam of the two or more additional cams to which the particular planet gear is coupled.

4. The transmission of claim 2, wherein rotation of the input member causes the eccentric member and the additional eccentric member to engage in respective eccentric motions that are between 170 and 190 degrees out of phase.

5. The transmission of claim 4, further comprising:

a plurality of mid-plane constraining elements, wherein a particular mid-plane constraining element of the plurality of mid-plane constraining elements substantially constrains, with respect to at least one degree of freedom, the location and rotation of a first particular roller of the plurality of rollers relative to a corresponding second particular roller of the plurality of additional rollers.

6. The transmission of claim 5, wherein the particular mid-plane constraining element, the first particular roller, and the second particular roller are coupled together.

7. The transmission of claim 5, wherein the particular mid-plane constraining element includes (i) a first constraining portion coupled to the first particular roller and (ii) a second constraining portion coupled to the second particular roller, the first and second constraining portion having respective shapes that constrain relative rotation between the first and second particular rollers about a first axis of rotation while permitting relative rotation between the first and second particular rollers about second and third axes of rotation that are orthogonal to the first axis and while also permitting relative translation between the first and second particular rollers.

8. The transmission of claim 5, wherein the particular mid-plane constraining element includes a rod that is disposed within apertures in the first and second particular rollers such that the particular mid-plane constraining element constrains relative rotation between the first and second particular rollers about a first axis of rotation while permitting relative translation between the first and second particular rollers along the first axis of rotation.

9. The transmission of claim 5, wherein the particular mid-plane constraining element includes a first roller and a second roller, wherein the first roller is in contact with an additional contact surface of the ground member and the second roller is in contact with an additional contact surface of the eccentric member such that that rotation of the input member results in the first roller and the second roller engaging in rolling motion in contact with the additional contact surface of the ground member and the additional contact surface of the eccentric member, respectively.

10. The transmission of claim 9, wherein the particular mid-plane constraining element additionally includes a third roller that is in contact with an additional contact surface of the additional eccentric member such that that rotation of the input member results in the third roller engaging in rolling motion in contact with the additional contact surface of the additional eccentric member.

11. The transmission of claim 5, further comprising a cage that is in contact with the plurality of mid-plane constraining elements so as to maintain the locations of the plurality of mid-plane constraining elements relative to each other.

12. The transmission of claim 11, further comprising an additional cage that is in contact with the plurality of rollers so as to maintain the locations of the plurality of rollers relative to each other.

13. The transmission of claim 11, wherein the particular mid-plane constraining element includes a first roller that is in contact with an additional contact surface of the ground member such that that rotation of the input member results in the first roller engaging in rolling motion in contact with the additional contact surface of the ground member.

14. The transmission of claim 5, wherein the particular mid-plane constraining element is in geared contact with an additional contact surface of the ground member.

15. The transmission of claim 1, wherein a particular roller of the plurality of rollers has at least two inward-facing contact surfaces that are in contact with the contact surfaces of the eccentric member.

16. The transmission of claim 1, wherein the two or more planet gears, the two or more cams, and the eccentric member form a first sub-transmission, and wherein the transmission additionally comprises:

two or more additional sub-transmissions, each of the additional sub-transmissions including a respective additional eccentric member, additional two or more planet gears, and additional two or more cams.

17. The transmission of claim 16, wherein rotation of the input member causes the eccentric member and the eccentric members of the additional sub-transmissions to engage in respective eccentric motions having phases that are substantially evenly separated.

18. The transmission of claim 1, wherein each of the two or more cams is coupled to and rotates around a respective axle having a respective bearing, and wherein the output member is coupled to the eccentric member via the bearings and axles.

19. The transmission of claim 1, further comprising two or more pins that are in rolling contact with contact surfaces of the output member and additional contact surfaces of the eccentric member, wherein the output member is coupled to the eccentric member via the two or more pins.

20. The transmission of claim 1, further comprising a cage that is in contact with the plurality of rollers so as to maintain the locations of the plurality of rollers relative to each other.

21. The transmission of claim 20, wherein the cage includes first and second contact surfaces that are in rolling contact with an additional contact surface of the ground member and an additional contact surface of the eccentric member, respectively.

22. A transmission comprising:
an input member;
a first eccentric member that is coupled to the input member such that rotation of the input member results in eccentric motion of the first eccentric member, wherein the first eccentric member has first and second contact surfaces that define a series of variable-width cutouts;
a second eccentric member that is coupled to the input member such that rotation of the input member results in eccentric motion of the second eccentric member, wherein the second eccentric member has thud and fourth contact surfaces that define a series of variable-width cutouts;
a ground member that has (i) fifth and sixth contact surfaces that define a series of variable-width cutouts and (ii) seventh and eighth contact surfaces that define a series of variable-width cutouts;
an output member coupled to the first and second eccentric members such that rotation of the first and second eccentric members results in rotation of the output member; and
a first plurality of rollers and a second plurality of rollers, each roller of the first plurality of rollers being in contact with the first, second, fifth, and sixth contact surfaces and each roller of the second plurality of rollers being in contact with the third, fourth, seventh, and eighth contact surfaces such that rotation of the input member results in rotation of the first and second eccentric members, whereby the rotation of the input member causes rotation of the output member, wherein each roller of the first plurality of rollers is coupled to a corresponding roller of the second plurality of rollers via a respective mid-plane constraining element that constrains, with respect to at least one degree of freedom, the location and rotation of the roller of the first plurality of rollers relative to the corresponding roller of the second plurality of rollers.

23. The transmission of claim 22, further comprising:
a first cam that is coupled to the input member such that rotation of the input member results in rotation of the first cam, wherein the first eccentric member is coupled to the first cam such that rotation of the first cam results in eccentric motion of the first eccentric member; and
a second cam that is coupled to the input member such that rotation of the input member results in rotation of the second cam, wherein the second eccentric member is coupled to the second cam such that rotation of the second cam results in eccentric motion of the second eccentric member and wherein the first cam and second cam are coupled to the input member in an offset manner such that rotation of the input member causes the first eccentric member and the second eccentric member to engage in respective eccentric motions that are between 170 and 190 degrees out of phase.

24. The transmission of claim 22, wherein a particular roller of the first plurality of rollers has at least two inward-facing contact surfaces that are in contact with the first and second contact surfaces of the first eccentric member.

25. The transmission of claim 22, wherein a particular one of the mid-plane constraining elements corresponds to a first roller of the first plurality of rollers and to a second roller of the second plurality of rollers, and wherein the particular mid-plane roller and the first and second rollers are coupled together.

26. The transmission of claim 22, wherein a particular one of the mid-plane constraining elements corresponds to a first roller of the first plurality of rollers and to a second roller of the second plurality of rollers, and wherein the particular mid-plane constraining elements includes (i) a first constraining portion coupled to the first roller and (ii) a second constraining portion coupled to the second roller, the first and second constraining portion having respective shapes that constrain relative rotation between the first and second rollers about a first axis of rotation while permitting relative rotation between the first and second rollers about second and third axes of rotation that are orthogonal to the first axis and while also permitting relative translation between the first and second rollers.

27. The transmission of claim 22, wherein a particular one of the mid-plane constraining elements corresponds to a first roller of the first plurality of rollers and to a second roller of the second plurality of rollers, and wherein the particular mid-plane constraining element includes a rod that is disposed within apertures in the first and second rollers such that the particular mid-plane constraining element constrains relative rotation between the first and second rollers about a first axis of rotation while permitting relative translation between the first and second rollers along the first axis of rotation.

28. The transmission of claim 22, wherein a particular one of the mid-plane constraining elements includes a first roller and a second roller wherein the first roller is in contact with an additional contact surface of the ground member and the second roller is in contact with an additional contact surface of the first eccentric member such that that rotation of the input member results in the first roller and the second roller engaging in rolling motion in contact with the additional contact surface of the ground member and the additional contact surface of the first eccentric member, respectively.

29. The transmission of claim 28, wherein the particular mid-plane constraining element additionally includes a third roller that is in contact with an additional contact surface of the second eccentric member such that that rotation of the input member results in the third roller engaging in rolling motion in contact with the additional contact surface of the second eccentric member.

30. The transmission of claim 22, further comprising a cage that is in contact with each of the mid-plane constraining elements so as to maintain the locations of the mid-plane constraining elements relative to each other.

31. The transmission of claim 30, further comprising an additional cage that is in contact with each roller of the first plurality of rollers so as to maintain the locations of the first plurality of rollers relative to each other.

32. The transmission of claim 30, wherein a particular one of the mid-plane constraining elements includes a first roller that is in contact with an additional contact surface of the ground member such that that rotation of the input member results in the roller bearing engaging in rolling motion in contact with the additional contact surface of the ground member.

33. The transmission of claim 22, wherein a particular one of the mid-plane constraining elements is in geared contact with an additional contact surface of the ground member.

34. The transmission of claim 22, further comprising two or more pins that are in rolling contact with contact surfaces of the output member and additional contact surfaces of the first and second eccentric members, wherein the output member is coupled to the first and second eccentric members via the two or more pins.

35. The transmission of claim 22, further comprising a cage that is in contact with each roller of the first plurality of rollers so as to maintain the locations of the first plurality of rollers relative to each other.

36. The transmission of claim 35, wherein the cage includes first and second contact surfaces that are in rolling contact with an additional contact surface of the around member and an additional contact surface of the first eccentric member, respectively.

37. A transmission comprising:
  an input member;
  a first eccentric member that is coupled to the input member such that rotation of the input member results in eccentric motion of the first eccentric member;
  a second eccentric member that is coupled to the input member such that rotation of the input member results in eccentric motion of the second eccentric member in phase with the eccentric motion of the first eccentric member, wherein the first and second eccentric members have respective first and second contact surfaces that define a series of variable-width cutouts;
  a third eccentric member that is coupled to the input member such that rotation of the input member results in eccentric motion of the third eccentric member, wherein the third eccentric member has third and fourth contact surfaces that define a series of variable-width cutouts, and wherein the third eccentric member is located between the first eccentric member and the second eccentric member;
  a ground member that has (i) fifth and sixth contact surfaces that define a series of variable-width cutouts and (ii) seventh and eighth contact surfaces that define a series of variable-width cutouts;
  an output member coupled to the first, second, and third eccentric members such that rotation of the first, second, and third eccentric members results in rotation of the output member; and
  a first plurality of rollers and a second plurality of rollers, each roller of the first plurality of rollers being in contact with the first, second, fifth, and sixth contact surfaces, and each roller of the second plurality of rollers being in contact with the third, fourth, seventh, and eighth contact surfaces such that rotation of the input member results in rotation of the first and second eccentric members, whereby the rotation of the input member causes rotation of the output member, wherein each roller of first plurality of rollers is coupled to a corresponding roller of the second plurality of rollers via a respective mid-plane constraining element that constrains, with respect to at least one degree of freedom, the location and rotation of the roller of the first plurality of rollers relative to the corresponding roller of the second plurality of rollers.

38. The transmission of claim 37, wherein a particular first roller of the first plurality of rollers comprises a first half-roller that is in contact with the first and fifth contact surfaces and a second half-roller that is in contact with the second and sixth contact surfaces, and wherein the first and second half-rollers are coupled together by a tension member configured to maintain an axial spacing between the first and second half-rollers.

39. The transmission of claim 38, wherein the tension member is part of a particular one of the mid-plane constraining elements that corresponds to the particular first roller, wherein the particular mid-plane constraining element also corresponds to a particular second roller of the second plurality of rollers, and wherein the tension member is disposed within an aperture in the particular, second roller such that the tension member constrains relative rotation between the particular first roller and particular second roller about a first axis of rotation while permitting relative translation between the particular first roller and particular second roller along the first axis of rotation.

40. The transmission of claim 37, wherein a particular one of the mid-plane constraining elements includes a first roller and a second roller, wherein the first roller is in contact with an additional contact surface of the around member and the second roller is in contact with an additional contact surface of the third eccentric member such that that rotation of the input member results in the first roller and the second roller engaging in rolling motion in contact with the additional contact surface of the around member and the additional contact surface of the third eccentric member, respectively.

41. The transmission of claim 40, wherein the particular mid-plane constraining element additionally includes a third roller that is in contact with an additional contact surface of the first eccentric member such that that rotation of the input member results in the third roller engaging in rolling motion in contact with the additional contact surface of the first eccentric member.

42. The transmission of claim 37, further comprising a cage that is in contact with each of the mid-plane constraining elements so as to maintain the locations of the mid-plane constraining elements relative to each other.

43. The transmission of claim 37, wherein a particular one of the mid-plane constraining elements includes a first roller that is in contact with an additional contact surface of the ground member such that that rotation of the input member results in the first roller engaging in rolling motion in contact with the additional contact surface of the ground member.

44. The transmission of claim 37, further comprising a cage that is in contact with each roller of the first plurality of rollers so as to maintain the locations of the first plurality of rollers relative to each other.

* * * * *